(12) United States Patent
Nakaoka et al.

(10) Patent No.: US 7,341,256 B2
(45) Date of Patent: Mar. 11, 2008

(54) SEAL RING

(75) Inventors: Shinya Nakaoka, Tsukuba (JP);
Nobuyuki Eguchi, Nihonmatsu (JP);
Naohiro Jotaki, Nihonmatsu (JP);
Takaaki Yasudomi, Nihonmatsu (JP)

(73) Assignee: NOK Corporation, Tokyo (JP)

( * ) Notice: Subject to any disclaimer, the term of this patent is extended or adjusted under 35 U.S.C. 154(b) by 75 days.

(21) Appl. No.: 10/522,385

(22) PCT Filed: Jul. 25, 2003

(86) PCT No.: PCT/JP03/09469

§ 371 (c)(1),
(2), (4) Date: Jan. 26, 2005

(87) PCT Pub. No.: WO2004/011827

PCT Pub. Date: Feb. 5, 2004

(65) Prior Publication Data

US 2006/0038355 A1    Feb. 23, 2006

(30) Foreign Application Priority Data

Jul. 26, 2002   (JP)   .............................. 2002-218213
Nov. 7, 2002    (JP)   .............................. 2002-324188

(51) Int. Cl.
*F16J 9/14* (2006.01)
*B60T 11/236* (2006.01)
*F02F 5/00* (2006.01)

(52) U.S. Cl. .................................... 277/496

(58) Field of Classification Search ................ 277/435,
277/437, 496–499, 573, 574, 529, 648, 649
See application file for complete search history.

(56) References Cited

U.S. PATENT DOCUMENTS

| 210,848   | A | * | 12/1878 | Gingras    | 411/531   |
| 615,902   | A | * | 12/1898 | Raworth    | 277/497   |
| 1,285,780 | A | * | 11/1918 | Moratta    | 277/499   |
| 1,475,723 | A | * | 11/1923 | Rosenberg  | 24/113 R  |
| 1,489,464 | A | * | 4/1924  | Small      | 277/445   |
| 1,532,547 | A | * | 4/1925  | Pruyn      | 277/499   |
| 1,535,552 | A | * | 4/1925  | Small      | 277/445   |
| 1,544,180 | A | * | 6/1925  | Reiter     | 277/461   |
| 1,589,482 | A | * | 6/1926  | Penberthy  | 277/498   |
| 2,080,935 | A | * | 5/1937  | Slyk       | 277/496   |
| 2,670,257 | A | * | 2/1954  | Bergeron   | 277/469   |
| 3,784,215 | A | * | 1/1974  | Ruthenberg | 277/496   |

(Continued)

FOREIGN PATENT DOCUMENTS

| JP | 58-127255 | 8/1983 |
| JP | 08-014396 | 1/1996 |
| JP | 08-028709 | 2/1996 |

(Continued)

*Primary Examiner*—Patricia Engle
*Assistant Examiner*—Gilbert Lee
(74) *Attorney, Agent, or Firm*—Jacobson Holman PLLC

(57) ABSTRACT

A seal ring which maintains a stable sealing performance over a long term is provided. In a first seal portion, linear contact portions which come into linear contact with the sidewall surface of an annular groove on the unsealed fluid side are continuously extended over the whole circumference of the seal ring from one side of a separation portion to the other side thereof, and the linear contact part provided at the convex part of the separation portion, and the linear contact part provided at the concave part of the separation portion are located at a distance in the radial direction of the seal ring.

18 Claims, 32 Drawing Sheets

U.S. PATENT DOCUMENTS

| | | | | |
|---|---|---|---|---|
| 4,361,337 A * | 11/1982 | Montes | ........................ | 277/499 |
| 4,438,935 A | 3/1984 | Lees | ........................ | 277/205 |
| 4,533,149 A * | 8/1985 | Vater et al. | ................. | 277/499 |
| 4,844,487 A * | 7/1989 | Eakin | ........................ | 277/497 |
| 5,002,290 A * | 3/1991 | Pernin | ........................ | 277/649 |
| 5,713,578 A | 2/1998 | Terao et al. | ................... | 277/27 |
| 5,934,680 A * | 8/1999 | Kakehi et al. | ............... | 277/499 |
| 6,386,548 B1 * | 5/2002 | Grimanis et al. | ............ | 277/584 |
| 6,685,193 B2 * | 2/2004 | Roberts et al. | ............. | 277/459 |
| 2003/0102633 A1 * | 6/2003 | Abiko | ........................ | 277/529 |

FOREIGN PATENT DOCUMENTS

| | | |
|---|---|---|
| JP | 08-159290 | 6/1996 |
| JP | 08-159291 | 6/1996 |
| JP | 09-317886 | 12/1997 |
| JP | 10-169782 | 6/1998 |
| JP | 2001-165322 | 6/2001 |
| WO | WO0184024 A1 * | 8/2001 |
| WO | WO01/84024 | 11/2001 |

\* cited by examiner

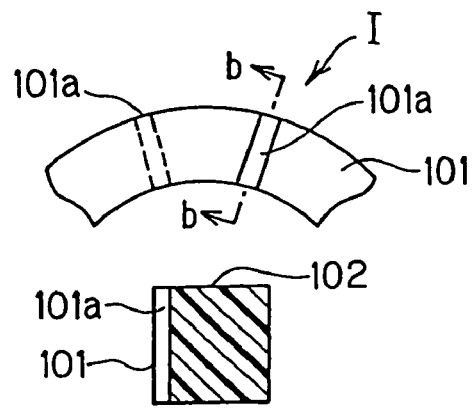
FIG. 36A
PRIOR ART
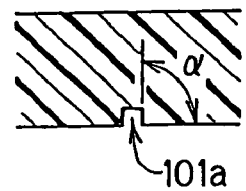
FIG. 36B
PRIOR ART
FIG. 36C
PRIOR ART
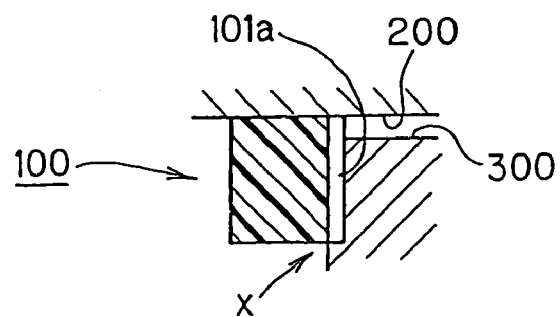
FIG. 37
PRIOR ART

SEAL RING

This is a nationalization of PCT/JP03/09469 filed Jul. 25, 2003 and published in Japanese.

TECHNICAL FIELD

This invention relates to a seal ring for sealing the annular interspace between two members which are disposed so as to be rotatable relative to each other.

BACKGROUND ART

Heretofore, a seal ring of this type has been employed in hydraulic devices, for example, the automatic transmission of an automobile.

Now, a seal ring according to a prior-art technique will be explained with reference to FIGS. 34 and 35.

FIG. 34 is a planar model view of the seal ring according to the prior-art technique, while FIG. 35 is a model-like sectional view showing the mounted state of the seal ring according to the prior-art technique.

The illustrated seal ring 100 serves to seal the annular interspace between a housing 200 provided with a shaft hole and a shaft 300 inserted in the shaft hole, and it is used in a state where it is mounted within an annular groove 301 provided in the shaft 300.

The seal ring 100 is formed of a resin material, and it includes a first seal portion 101 for sealing the sidewall surface of the annular groove 301 provided in the shaft 300, and a second seal portion 102 for sealing the inner peripheral surface of the shaft hole provided in the housing 200.

Herein, when a pressure acts in the direction of an arrow P in FIG. 35, from the sealed fluid side O toward the unsealed fluid side A, the seal ring 100 is urged onto the unsealed fluid side A, and hence, the first seal portion 101 urges the sidewall surface of the annular groove 301, while the second seal portion 102 urges the inner peripheral surface of the shaft hole provided in the housing 200 and opposing to the annular groove 301, so as to seal the surfaces at the positions of the respective seal portions.

In this way, the sealed fluid has been prevented from leaking onto the unsealed fluid side A.

Here, the sealed fluid is, for example, lubricating oil, and it signifies ATF especially in a case where the seal ring is utilized for the automatic transmission of an automobile.

Besides, as shown in FIG. 34, the ring body of the seal ring 100 is provided with a separation portion So at one part in the circumferential direction thereof for the purposes of enhancing an assemblability, etc.

Various aspects have been known as such a separation portion So, and a special step cut in the shape of two steps has been known as an aspect capable of suitably coping even with the change of an ambient temperature.

According to the special step cut, the wall surfaces of the ring body in the circumferential direction thereof come into close contact with each other, so that the sealed fluid can be prevented from leaking. Moreover, owing to a construction wherein the seal ring cuts off the sealed fluid side and the unsealed fluid side while the surfaces of the ring body perpendicular to the circumferential direction define gaps in the circumferential direction therebetween, even when the seal ring has relatively moved in the circumferential direction on account of the discrepancy of the coefficients of linear expansion attributed to the different materials of the seal ring and the housing, the variations of dimensions can be absorbed in correspondence with the gaps while a tightly enclosing state is kept, so that the seal ring can suitably maintain a tightly enclosing performance even against the ambient temperature change.

In such a seal ring 100, especially in a case where the shaft 300 is of an aluminum alloy or the like soft material, especially the sidewall surface of the annular groove 301 has worn away on account of the slide between the first seal portion 101 and the sidewall surface of the annular groove 301, which is ascribable to the relative rotation between the seal ring 100 and the shaft 300.

This is because a lubricating film based on the lubricating oil is difficult to be formed between the first seal portion 101 and the sidewall surface of the annular groove 301. Especially in a case where any foreign matter existent in the lubricating oil has been bitten between the first seal portion and the sidewall surface, or where the accumulation of wear powder, or the like has occurred, the wear becomes intense. Also, in a case where the seal ring 100 has been used under a high pressure and at a high rotational speed, the first seal portion 101 and the sidewall surface of the annular groove 301 become a high temperature on account of the relative rotation between the seal ring 100 and the shaft 300, and the seal ring 100 is sometimes molten.

As a technique for reducing such wear, there has been known one wherein a slot which serves to feed the lubricating oil being the sealed fluid between the first seal portion 101 and the sidewall surface of the annular groove 301 is provided, thereby to form a lubricating film and to enhance a wear-proofness (for example, JP-A-9-96363).

FIG. 36 shows model diagrams of a seal ring according to a prior-art technique, wherein FIG. 36A is a model-like partial plan view, FIG. 36B is a sectional view taken along b-b in FIG. 36A, and FIG. 36C is a side view seen in an I-direction in FIG. 36A.

As shown in FIG. 36, the first seal portion 101 is provided with the communicating slot 101a for communicating the sealed fluid side O with the unsealed fluid side A, whereby the lubricating oil on the sealed fluid side O is caused to leak into the communicating slot 101a. Thus, when the first seal portion 101 has come into sliding contact with the sidewall surface of the annular groove 301, the lubricating film is formed between them, to improve the lubricating state of the seal surface and to attain enhancement in the wear-proofness.

Besides, the provision of the communicating slot 101a, not only forms the lubricating film, but also affords the function of vomiting the foreign matter existent in the lubricating oil and the wear powder ascribable to the wear, onto the unsealed fluid side A so as not to be bitten between the first seal portion 101 and the sidewall surface of the annular groove 301, and it cools the seal surface owing to the formation of the lubricating film, thereby to attain the enhancement of the wear-proofness still more.

Even with the seal ring according to the prior-art technique as explained above, however, the occurrence of the wear of the sidewall surface of the annular groove 301 is often found. As the result of a study by the Inventor, it has been revealed that the sidewall surface of the soft metal wears away because the foreign matter existent in the lubricating oil intervenes between the sliding surfaces.

Besides, in a case where the wear has proceeded due to a long-term use, the sidewall surface of the annular groove 301 wears away only at its part with which the first seal portion 101 is brought into sliding contact, as shown in FIG. 37, so that the seal ring 100 is pushed inwards with respect to the original position of the sidewall surface of the annular groove 301 in correspondence with a component having worn.

In addition, when the bottom surface of the communicating slot 101a has reached that plane of the sidewall surface of the annular groove 301 which is not worn, a path leading to the communicating slot 101a is cut off as indicated by an arrow X in FIG. 37, and the lubricating oil fails to be fed, so that the drawback of the occurrence of abnormal wear might take place.

In this regard, there has also been known a seal ring 400 whose sectional shape is trapezoidal as shown in FIGS. 38 and 39. The seal ring 400 has been constructed for the purpose that a seal portion 402 comes into linear contact in order to reduce sliding friction, and the seal portion 402 is formed at the upper end edge of the annular groove 301.

In case of the seal ring 400, leakage occurs through the gap Z between a convex part and a concave part in the special step cut, irrespective of whether or not the sidewall surface of the annular groove inclines. Another problem is that, since the quantity of leakage changes depending upon the inclination angle of the annular groove, a stable leakage characteristic is not obtained.

Besides, in a case where the soft metal is applied to the shaft in this seal ring, the quantity of wear of the side surface of the shaft groove is small, but the quantity of leakage thereat changes depending upon a gap To. The gap To=width of about 0.2-0.6 mm holds depending upon the dimensional tolerance of the outside diameter of the seal ring and that of the hole diameter of the housing, and the quantity of leakage in that case can become about 200-500 cc/min (0.2-0.5 l/min).

The quantity of leakage of the seal ring which has the separation portion of the general special step cut is at most 100 cc/min (0.1 l/min). In such a case as stated above, the quantity of leakage is excessive and is therefore difficult to be coped with by the ordinary capacity of a hydraulic pump.

Besides, even when the quantity of leakage is coped with by enlarging the hydraulic pump capacity in such a case, a loss developing in the hydraulic pump increases. That is, there occurs the problem that a fuel cost degrades.

The present invention has been made in order to solve the problems of the prior-art techniques, and has for its object to provide a seal ring of excellent quality which attains reduction in the quantity of leakage while reducing rotational sliding friction, and which maintains a stable sealing performance over a long term.

DISCLOSURE OF THE INVENTION

The present invention consists in:

a seal ring including a first seal portion which seals a sidewall surface of an annular groove on a unsealed fluid side, the annular groove being provided in one of two members that are concentrically assembled so as to be relatively rotatable; and a second seal portion which seals a surface of the other of the two members;

wherein an annular interspace between the two members is sealed by the seal portions; and a ring body of the seal ring is provided with a separation portion which is separated in one place in a circumferential direction of the seal ring;

characterized in that the first seal portion is provided with linear contact portions which come into linear contact with the sidewall surface of the annular groove on the unsealed fluid side, so as to extend continuously over a whole circumference of the seal ring from one side of separation portion to the other side thereof; and that the linear contact portion which is provided on one side of the separation portion, and the linear contact portion which is provided on the other side of the separation portion are located at a distance in a diametric direction of the seal ring.

Since the first seal portion is made the linear contact portions which come into linear contact with the sidewall surface of the annular groove on the unsealed fluid side, the pressure receiving area of a sliding part can be decreased. Accordingly, the formation of a lubricating film based on lubricating oil can be made favorable, and the reduction of rotational sliding friction can be attained. Besides, even if any foreign matter has entered the sliding part, it can be easily vomited.

Further, it is permitted to control the quantity of leakage of a sealed fluid by the size of a gap which is formed owing to the fact that the linear contact portions are provided at the diametric distance in the separation portion.

Here, the "gap which is formed owing to the fact that the linear contact portions are provided at the diametric distance in the separation portion" signifies a space which is formed by the linear contact portion provided on one side of the separation portion, the linear contact portion provided on the other side, the side surface of the ring body as lies between the linear contact portion on one side and the linear contact portion on the other side. The quantity of leakage can be adjusted by adjusting the size of the sectional area of the section of the space in the diametric direction.

In order to form the space, the linear contact portion provided on one side of the separation portion, and the linear contact portion provided on the other side thereof have regions which are placed one over the other when the linear contact portions are projected in the diametric direction.

The regions which are placed one over the other when the linear contact portions are projected in the diametric direction, is set at a predetermined length in the circumferential direction, whereby the space can be made columnar, that is, a leakage path becomes columnar, and the oil passing resistance of the leakage path can be enlarged. Accordingly, the quantity of leakage can be suppressed more.

Further, the quantity of leakage can be controlled by adjusting the circumferential length of those regions of the linear contact portion provided on one side of the separation portion and the linear contact portion provided on the other side thereof which are placed one over the other when the linear contact portions are projected in the diametric direction.

Besides, even in a case where the linear contact portions do not have the regions which are placed one over the other when these linear contact portions are projected in the diametric direction, that is, where the linear contact portions are not extended to separation end parts in the circumferential direction, in the separation portion, respectively, a space is formed to form a leakage path, as long as the linear contact portions on one side and the other side of the separation portion are at a distance in the diametric direction, so that the quantity of leakage can be adjusted.

Besides, it is suitable that the linear contact portions define substantially mountain shaped portions which protrude from a side surface of the seal ring body, toward the sidewall surface of the annular groove on the unsealed fluid side. Incidentally, the "seal ring body" includes the separation portion. Here, the expression "linear contact" will be explained. The linear contact portions run in an elongate line to the sidewall surface of the annular groove on the unsealed fluid side. Therefore, the expression "linear contact" is used, and the linear contact portions have slight widths. Actually, in the case where the linear contact portions lie in contact with the sidewall surface of the annular groove on the unsealed fluid side, they lie contact at surfaces having the slight widths (the linear contact portions are sometimes endowed with slight widths). The expression "linear contact", however, is used in order to distinguish the invention from the case where the whole side surface of the ring body lie in contact as in the prior art.

Besides, it is suitable that the linear contact portion provided on one side of the separation portion is located nearer a side of the other member than the linear contact portion provided on the other side of the separation portion, and that one member mentioned above is assembled so as to rotate from the other side of the separation portion toward one side mentioned above, through separation end parts which is end parts of the separation portion.

Thus, the direction of the leakage path formed between the linear contact portions on one side and the other side of the separation portions, and the rotating direction of one member can be set at reverse directions. The "fact that the direction of the leakage path and the rotating direction of one member are the reverse directions" signifies that, on the other member side of the ring body, an opening which is formed by the linear contact portions on one side and the other side of the separation portion is opposite into the rotating direction of one member.

Accordingly, the foreign matter existing in the sealed fluid can be prevented from being fed in between the linear contact portions in the separation portion, and it can be prevented from intervening between the gap of the linear contact portions and the sidewall surface of the annular groove of one member, so that the wear of the sidewall surface becomes preventable.

In this case, it is also suitable that, on the other member side of the ring body, the separation end part of one side mentioned above which is provided with the linear contact portion is provided with a first circularly-arcuate protrusive part which protrudes in the circumferential direction, while the separation end part of the other side is provided with a first circularly-arcuate recessed part which is fitted with the first circularly-arcuate protrusive part, and that the first circularly-arcuate protrusive part is provided with a second circularly-arcuate protrusive part which protrudes in the circumferential direction, while the first circularly-arcuate recessed part is provided with a second circularly-arcuate recessed part which is fitted with the second circularly-arcuate protrusive part.

Here, it is meant that the first circularly-arcuate protrusive part is provided at the separation end part of one side mentioned above, in the case where one member mentioned above is assembled so as to rotate from the other side of the separation portion toward one side mentioned above, through the separation end part.

Thus, the separation portion can be endowed with a directivity, and it is therefore permitted to efficiently perform the job of mounting the seal ring in accordance with the rotating direction of one member mentioned above.

Besides, it is favorable that the linear contact portion is extended to the second circularly-arcuate protrusive part.

It is also suitable that the separation end part of one side as mentioned above, of the separation portion is provided with a circularly-arcuate protrusive part which protrudes in the circumferential direction, while the separation end part of the other side of the separation portion is provided with a circularly-arcuate recessed part which is fitted with the circularly-arcuate protrusive part, and that one of respective fitting surfaces at which the circularly-arcuate protrusive part and the circularly-arcuate recessed part are fitted is provided with a protrusion which comes into linear contact with the other surface.

Thus, even if the foreign matter existing in the sealed fluid has intruded into the separation portion, the protrusion lying in linear contact does not bite the foreign matter. Even if the foreign matter has been bitten, it is bitten between the parts lying in linear contact, and hence, it is easily vomited (a bite state is easily released). In this case, the shape of the protrusion should favorably be, for example, a substantially wedge-like sectional shape whose thickness decreases gradually toward the other surface.

Accordingly, even if the foreign matter existing in the sealed fluid has entered the separation portion, it is not bitten in the separation portion, and it is permitted to prevent the wear of the fitting surfaces from occurring. It is also permitted to prevent the wear of the sidewall surface from occurring due to the fact that the foreign matter is bitten into the separation portion.

Here, the protrusion which comes into linear contact with the other surface may be provided at only one of the respective fitting surfaces at which the circularly-arcuate protrusive part and the circularly-arcuate recessed part are fitted, and such protrusions may well be provided at the respective fitting surfaces.

It is also suitable that the fitting surfaces are surfaces which are substantially perpendicular to the axis of the seal ring, and which extend in the circumferential direction.

Besides, it is suitable that the linear contact portions include:

a first linear contact portion which is extended continuously from one side of the separation portion to the other side thereof, and which comes into linear contact with the sidewall surface of the annular groove on the unsealed fluid side; and a second linear contact portion which lies nearer a groove bottom side of the annular groove than the first linear contact portion, which is extended continuously from one side of the separation portion to the other side thereof, and which comes into linear contact with the sidewall surface of the annular groove on the unsealed fluid side;

wherein the linear contact portion provided on one side of the separation portion is the first linear contact portion, while the linear contact portion provided on the other side of the separation portion is the second linear contact portion.

A special step cut or a step cut can be mentioned as an example of the separation portion (dagger shape) as stated above.

Here, the "special step cut" is a separation structure in which two seal surfaces in the seal ring are both formed with stepped separation parts. Herein, the separation portion includes separation surfaces which extend in the circumferential direction, and the separation end edges of which are formed as parts of the stepped separation parts at the seal surfaces for the sidewall surface side of the annular groove on the unsealed fluid side.

On the other hand, the "step cut" is a separation structure in which a stepped separation part is formed on the seal surface side of two seal surfaces in the seal ring, for the sidewall surface side of the annular groove on the unsealed fluid side. Herein, the separation portion includes a separation surface which extends in the circumferential direction, and the separation end edge of which is formed as part of the stepped separation part.

Besides, the expression "two members which are concentrically assembled so as to be relatively rotatable" signifies, for example, a housing which is provided with a shaft hole, and a shaft which is inserted in the shaft hole. Herein, the annular groove is provided in either of the housing and the shaft, but such annular grooves may well be provided in both of them.

Incidentally, the above constructional features can be adopted in combination as far as possible.

BRIEF DESCRIPTION OF THE DRAWINGS

FIG. 36 is a view showing a seal ring according to a prior-art technique;

FIG. 37 is a view showing the seal ring according to the prior-art technique;

BEST MODE FOR CARRYING OUT THE INVENTION

First Embodiment

Figure 1:
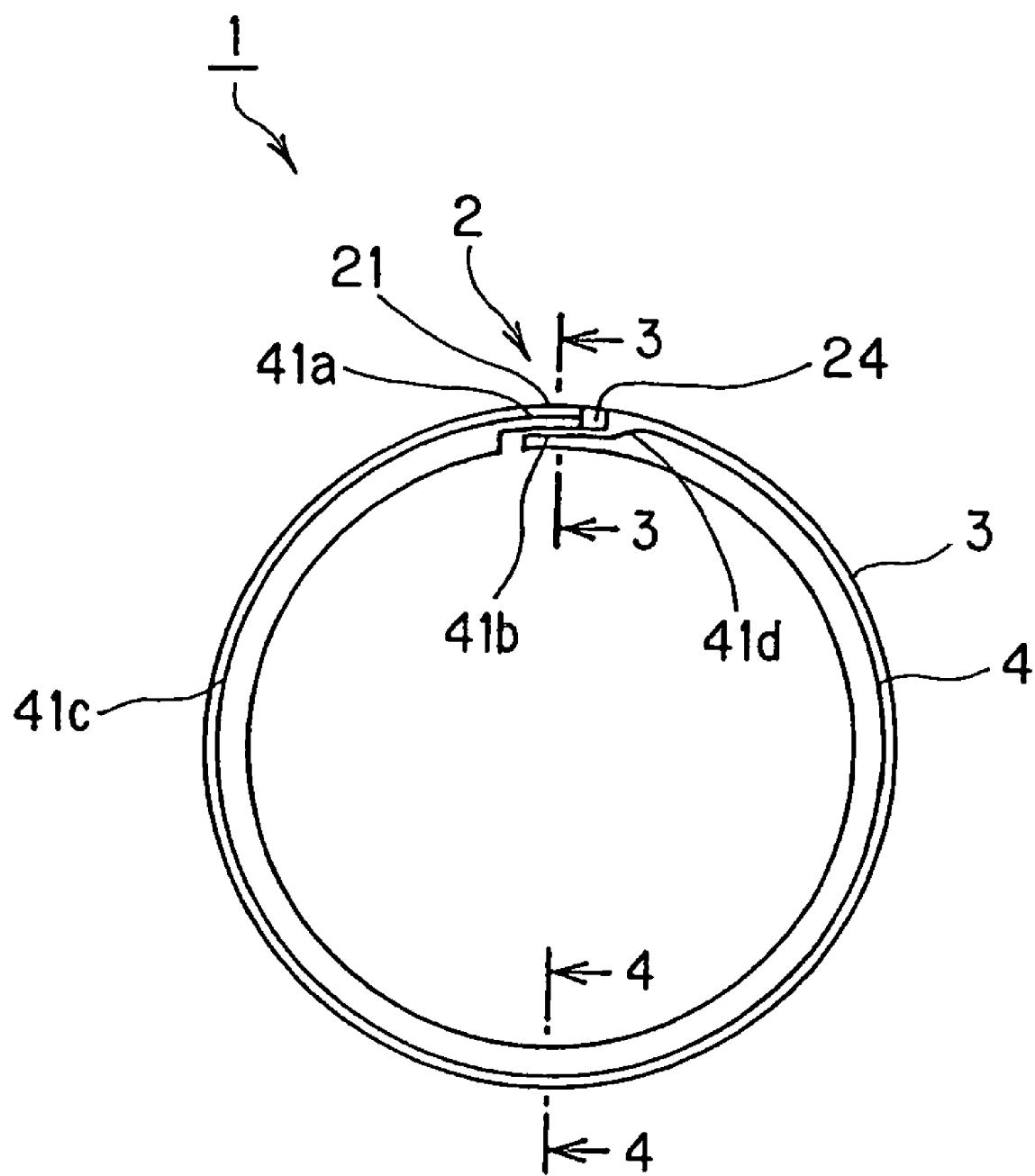
FIG. 1 is a plan view of a seal ring according to the first embodiment of the present invention.
Figure 4:
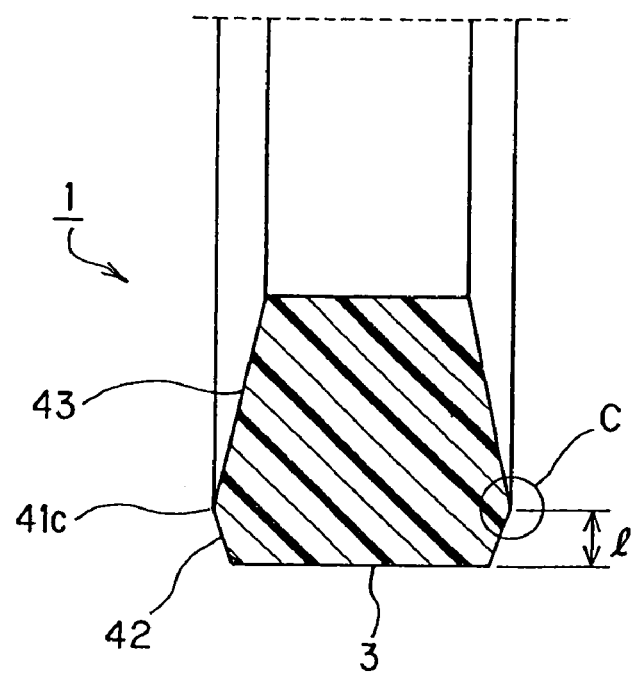
FIG. 4 is a sectional view of the seal ring taken along 4-4 indicated in FIG. 1.
Figure 5:
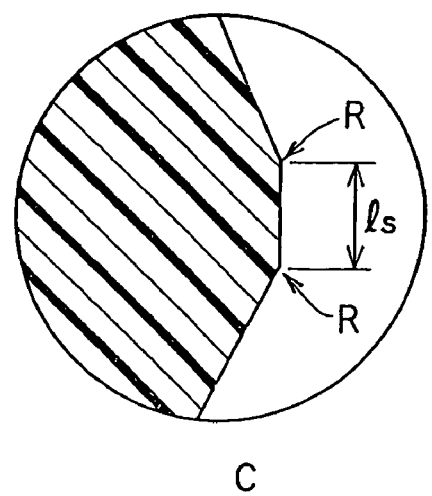
FIG. 5 is an enlarged view of a part C in FIG. 4.

A seal ring 1 according to the first embodiment of the present invention will be described with reference to FIG. 1-FIG. 5. FIG. 1 is a plan view of the seal ring 1 according to the first embodiment of the invention, FIG. 2 is a perspective view, partly broken away, showing the mounted state of the seal ring 1 according to this embodiment, FIG. 3 is a sectional view of the seal ring 1 taken along 3-3 indicated in FIG. 1, FIG. 4 is a sectional view of the seal ring 1 taken along 4-4 indicated in FIG. 1, and FIG. 5 is an enlarged view of a part C in FIG. 4.

The seal ring 1 serves to seal the annular interspace between a shaft 70 which is one member inserted in a shaft hole and a housing 80 which is the other member provided with the shaft hole, and it is used in a state where it is mounted within an annular groove 71 provided in the shaft 70.

Besides, the seal ring 1 is formed of a resin material, and it includes a first seal portion 4 for sealing the sidewall surface 72 of the unsealed fluid side A in the annular groove 71 provided in the shaft 70, and a second seal portion 3 for sealing the inner peripheral surface 81 of the shaft hole provided in the housing 80.

Figures 2, 3:
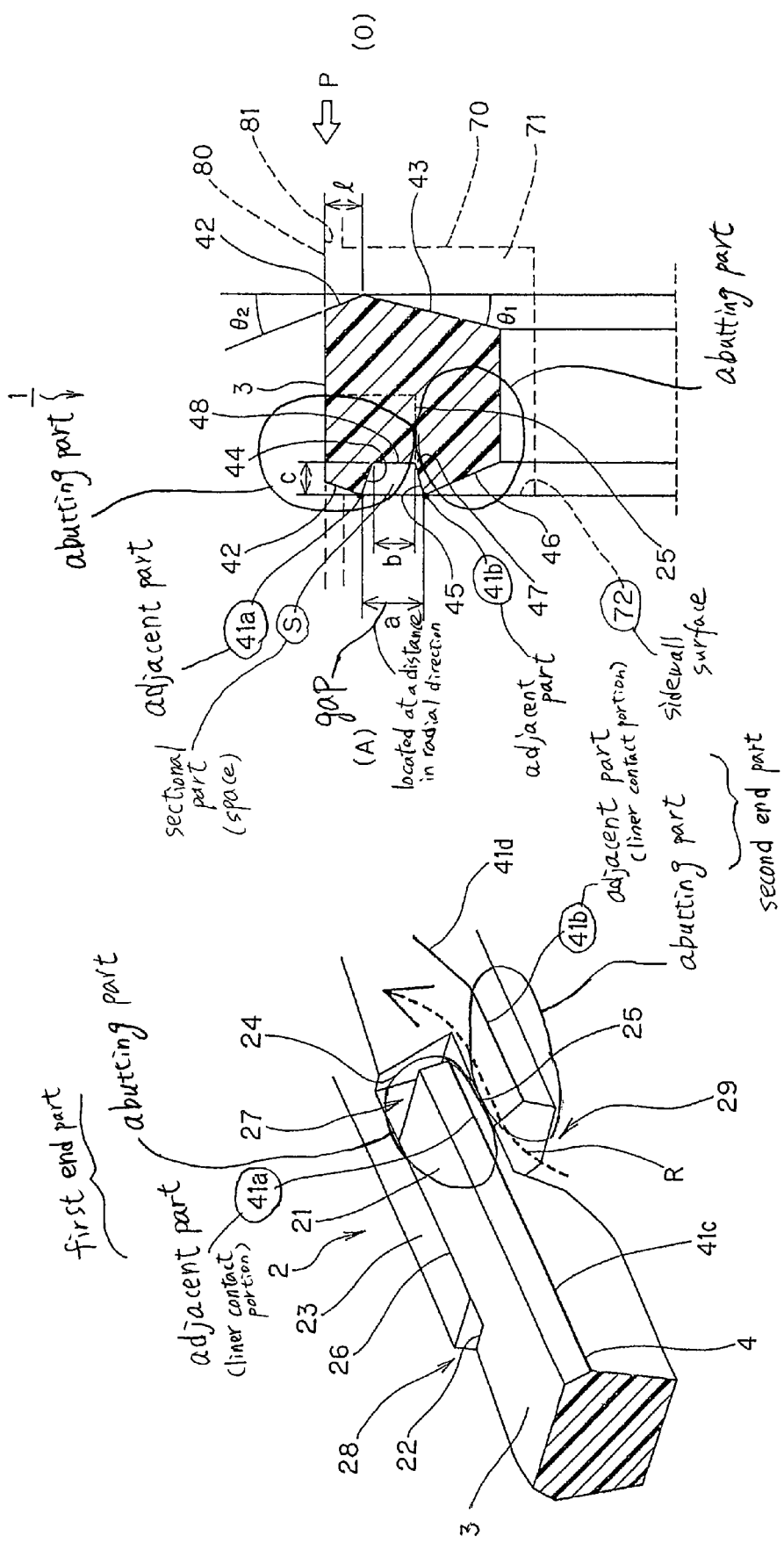
FIG. 2 is a perspective view, partly broken away, showing the mounted state of the seal ring according to the first embodiment of the invention.
FIG. 3 is a sectional view of the seal ring taken along 3-3 indicated in FIG. 1.

Herein, when a pressure acts in the direction of an arrow P in FIG. 3, from the sealed fluid side O toward the unsealed fluid side A, the seal ring 1 is urged onto the unsealed fluid side A, and hence, the first seal portion 4 urges the sidewall surface 72 of the annular groove 71, while the second seal portion 3 urges the inner peripheral surface 81 of the shaft opposing to the annular groove 71, so as to seal the surfaces at the positions of the respective seal portions.

In this way, the sealed fluid is prevented from leaking onto the unsealed fluid side A.

Here, the sealed fluid is, for example, lubricating oil, and it signifies ATF especially in a case where the seal ring is utilized for the transmission of an automobile.

Besides, as shown in the figures, the ring body of the seal ring 1 is provided with separation portions 2 at one part in the circumferential direction thereof for the purposes of enhancing an assemblability, etc.

Various aspects have been known as such separation portions 2, and a special step cut in the shape of two steps as shown in the figures has been adopted in this embodiment, as an aspect in which the quantity of leakage is small and which can suitably cope even with the change of an ambient temperature. More specifically, as shown in the figures, the stepped separation portions are formed on both the side of the first seal portion 4 and the side of the second seal portion 3.

The special step cut includes a convex part 21 and a concave part 22 in a widthwise (axial direction) pair, on one side of the outer peripheral side of the ring body through a separated part, and a concave part 24 and a convex part 23 in a widthwise pair, also on the other side. Besides, it is constructed so that the convex part 21 and the concave part 24 may be fitted, while the concave part 22 and the convex part 23 may be fitted.

According to the construction of the special step cut, the sealed fluid side O and the unsealed fluid side A are cut off while the surfaces of the ring body perpendicular to the circumferential direction thereof define gaps (in FIG. 2, a gap 27 which is formed by the distal end surface 21a of the convex part 21 and the opposite surface 24a of the concave part 24 opposing thereto, a gap 28 which is formed by the distal end surface of the convex part 23 and the opposite surface of the concave part 22 opposing thereto, and a gap 29 on the inner peripheral side of the ring body) in the circumferential direction.

That is, the convex part 21 and the concave part 24 are constructed so as to come into sliding contact at a separation surface 25 concentric with the second seal portion 3, and to come into sliding contact at a separation surface 26 perpendicular to the axis of the seal ring. Thus, notwithstanding that the gaps 27, 28 and 29 as stated above are defined, any part of the seal surfaces of both the second seal portion 3 and the first seal portion 4 does not break off due to the separation portion 2.

Accordingly, even when the ring body has been thermally expanded to cause fluctuations in the intervals of the gaps 27, 28 and 29, the seal ring can absorb the variations of dimensions in correspondence with the gaps while keeping a tightly enclosing state, and hence, it can maintain a tightly enclosing performance even against the change of an ambient temperature.

Besides, in the seal ring 1 according to this embodiment, the first seal portion 4 is constructed of linear contact portions 41 which comes into linear contact with the sidewall surfaces 72 of the annular groove 71.

In that region of the seal ring 1 which is not formed with the separation portion 2, the linear contact portion 41 is constructed of an mountain shaped portion (protrusion) which is formed of an inclination surface 42 that inclines from the unsealed fluid side A in the second seal portion 3, toward an inside diameter side (groove bottom side) being the side of the sidewall surface 72 of the annular groove 71, and an inclination surface 43 that inclines from the corner of the inner peripheral surface 5 of the seal ring 1 as lies on the unsealed fluid side A, toward an outside diameter side (opening side of the groove) being the side of the sidewall surface 72 of the annular groove 71.

Besides, at the convex part 21, the linear contact portion 41 is constructed of an mountain shaped portion (protrusion) which is formed of an inclination surface 42 that inclines from the unsealed fluid side A in the second seal portion 3, toward the groove bottom side being the side of the sidewall surface 72 of the annular groove 71, and an inclination surface 44 that is formed extending onto the outside diameter side from the corner 47 of the separation surface 25 of the convex part 21 as lies on the unsealed fluid side A, and that inclines from the outside diameter side end of the end surface 48 of the convex part 21 on the unsealed fluid side A, toward the outside diameter side being the side of the sidewall surface 72 of the annular groove 71.

Besides, at the concave part 24, the linear contact portion 41 is constructed of an mountain shaped portion (protrusion) which is formed of an inclination surface 45 that inclines from the corner 47 of the separation surface 25 of the concave part 24 as lies on the unsealed fluid side A, toward the inside diameter side being the side of the sidewall surface 72 of the annular groove 71, and an inclination surface 46 that inclines from the corner of the inner peripheral surface 5 of the concave part 24 as lies on the unsealed fluid side A, toward the outside diameter side being the side of the sidewall surface 72 of the annular groove 71.

Here, for the brevity of description, the linear contact portion 41 which is provided at the convex part 21 shall be described as a linear contact portion 41a, the linear contact portion 41 which is provided at the concave part 24 shall be described as a linear contact portion 41b, and the linear contact portion 41 which is provided in the region of the seal ring 1 which is not formed with the separation portion 2 shall be described as a linear contact portion 41c.

Besides, the linear contact portions 41a, 41b and 41c are continuously provided in the first seal portion 4, and the linear contact portions 41a and 41b are provided at a diametric distance in the separation portion 2 as shown in the figures, whereby a leakage path R (refer to FIG. 2) is formed between the linear contact portions 41a and 41b.

Here, the sectional shape of the linear contact portions in the separation portion of the seal ring will be described with reference to FIG. 3.

Referring to FIG. 3, a is let denote the length between the linear contact portions 41a and 41b in the diametric direction of the seal ring, b the diametric length of the end surface 48 of the convex part 21 on the unsealed fluid side A, c an axial length from the linear contact portion 41 to the end surface 48 of the convex part 21 on the unsealed fluid side A, S a sectional part which is determined by the dimensions a, b and c, l a diametric length from the second seal portion 3 to the linear contact portion 41a (or linear contact portion 41b), θ1 an angle which the inclination surface 43 defines to a plane perpendicular to the axis, and θ2 an angle which the inclination surface 42 defines to the plane perpendicular to the axis.

Besides, the sectional part S which is determined by the dimensions a, b and c is the diametric section of a space which is formed by the linear contact portions 41a and 41b, the end surface 48 of the convex part 21 on the unsealed fluid side A, and the sidewall surface 72 of the annular groove 71. That is, the sectional part corresponds to the section of the leakage path which is formed owing to the fact that the linear contact portions 41a and 41b are provided at the diametric distance in the separation portion 2. It is accordingly permitted to control the quantity of leakage, by appropriately adjusting the area of the sectional part S.

"Adjusting the area of the sectional part S" is to adjust the dimensions a, b and c.

The dimensions a, b and c should desirably be smaller from the viewpoint of reducing the quantity of leakage, but when they are excessively small, any foreign matter existing in the sealed fluid becomes incapable of passing through the sectional part.

Accordingly, the dimensions b and c should suitably be 0.1-0.5 mm, preferably 0.15-0.3 mm. Besides, when the facility of the passing of the foreign matter and the reduction of the quantity of leakage are considered, it is desirable to make the dimensions b and c substantially equal.

Besides, the dimension a is made somewhat larger than the dimension b so as to taper the side surfaces of the leakage path, whereby the releasability of a mold in a molding operation is made good.

Besides, the dimension l should desirably be small for reducing a dragging torque which is caused by the relative rotation of the shaft and the seal ring, but when it is excessively small, the seal ring might lie in the annular interspace between the shaft hole of the housing 80 and the shaft 70 without contacting the sidewall surface 72 of the annular groove 71 at its linear contact portion 41. That is, it is apprehended that a gap will appear in the linear contact part between the side surface of the seal ring and the sidewall surface 72 of the annular groove 71, so the quantity of leakage will increase.

Accordingly, in a case where H denotes the dimension of the inside diameter of the housing, where J denotes the dimension of the outside diameter of the shaft, and where j=0.1 through 0.3 mm holds, $l=H-J+j$ or so is suitable.

Also, it is apprehended that the seal ring will be twisted and deformed by the pressure of the sealed fluid. When the angles θ1 and θ2 of the side surface of the seal ring are excessively small, it is considered that a linear contact state will not be held in a case where the seal ring has been twisted and deformed by the pressure of the sealed fluid. On the other hand, when the angles θ1 and θ2 of the side surface of the seal ring are excessively large, the cross-sectional area of the seal ring decreases, and hence, the molding of the seal ring becomes difficult.

Accordingly, the angles θ1 and θ2 should desirably be set at 5-20 degrees.

Here, FIG. 5 is the enlarged view of the part C in FIG. 4, and the linear contact portion 41 is enlarged therein. As shown in FIG. 5, the distal end of the linear contact portion 41 has a predetermined width in the diametric direction. The width ls should favorably be set at 0.05-0.3 mm, preferably 0.1-0.2 mm, in consideration of the suppression of the leakage quantity and the vomitability or eliminability of the foreign matter. Besides, both the ends of the linear contact portion 41 should favorably be chamfered to R0.1 or less.

In this embodiment, as shown in FIGS. 1 and 2, the linear contact portions 41 are provided extending from that region of the seal ring 1 which is not formed with the separation portion 2, to the concave part 24, via a shift part 41d at which the linear contact portion 41c lying on the outer peripheral side of the ring side surface shifts to the linear contact portion 41b lying on the inner peripheral side. However, the invention is not restricted to this aspect, but the linear contact portions 41a and 41b which are respectively provided at the convex part 21 and the concave part 24 may continuously extend over the whole circumference from the convex part 21 to the concave part 24, in a state where these linear contact portions 41a and 41b are not placed one over the other on the circumference, that is, where they are spaced in the diametric direction. The position and shape of the shift part, and the existence or nonexistence of the shift part are not directly pertinent to the invention.

Besides, in this embodiment, the linear contact portions 41 are respectively extended to the separation ends of the convex part 21 and the concave part 24 in the circumferential direction, whereby the linear contact portions 41a and 41b provided at the convex part 21 and the concave part 24 are placed one over the other when projected in the diametric direction, but the invention is not restricted to this aspect.

More specifically, the linear contact portions need not be respectively extended to the separation ends in the circumferential direction at the convex part 21 and the concave part 24, but the sectional part S constructing the leakage path may be formed in the sectional shape of the separation portion 2. Besides, even in a case where the linear contact portions provided at the convex part 21 and the concave part 24 are not placed one over the other when projected in the diametric direction, the leakage path is formed as long as these linear contact portions are spaced in the diametric direction. Therefore, the sectional part S is supposed to be formed, and it is adjusted, whereby the quantity of leakage is controllable.

Figure 6:
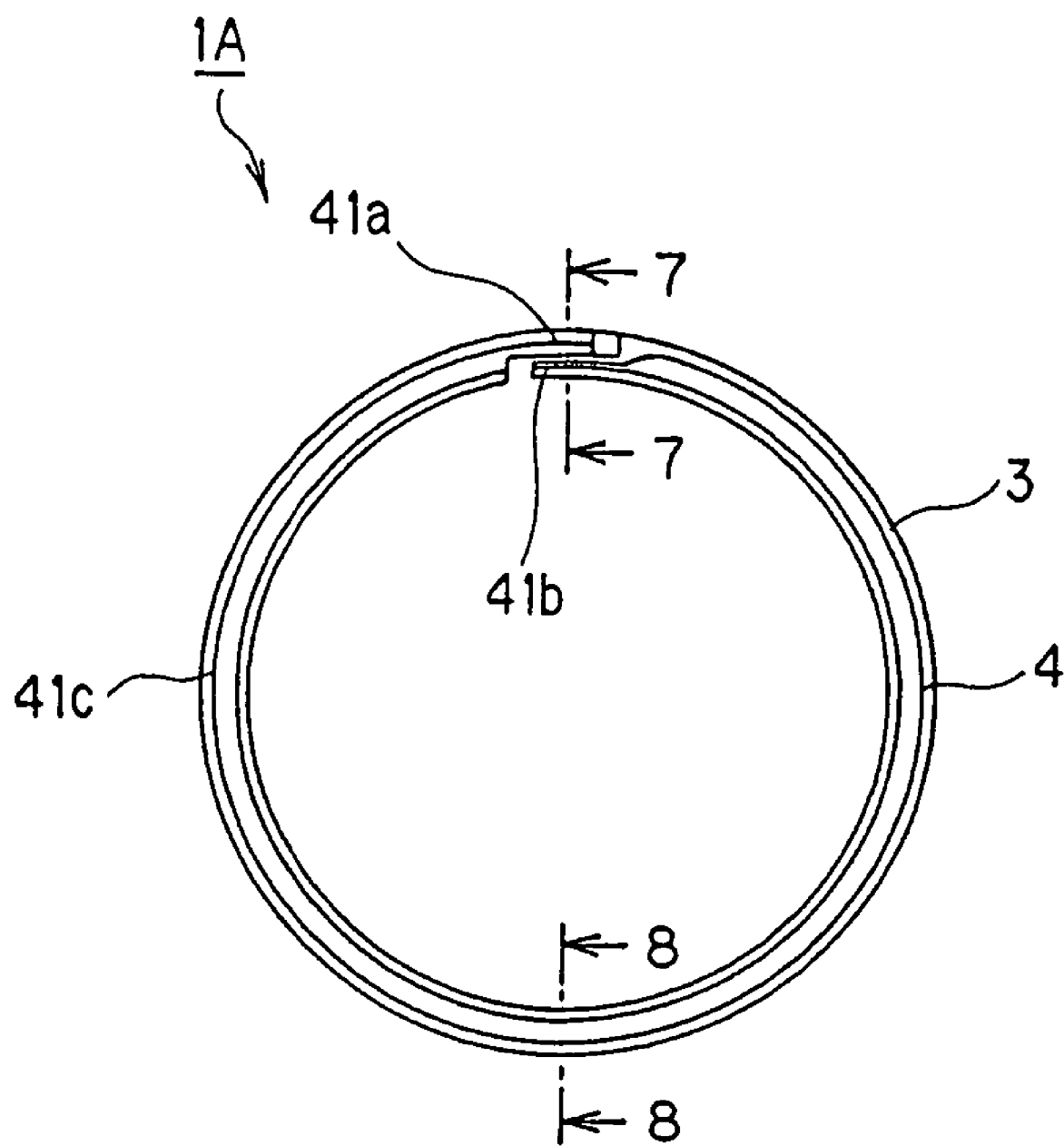
FIG. 6 is a plan view showing a modification to the seal ring according to the first embodiment of the invention.
Figure 7:
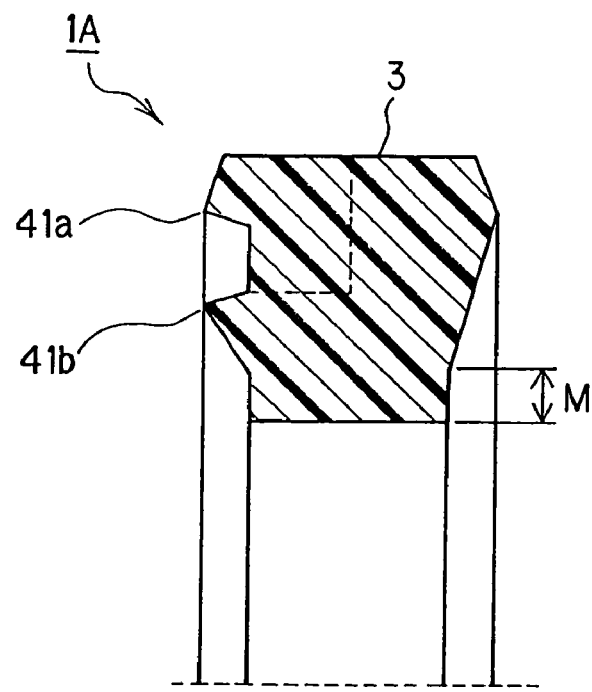
FIG. 7 is a sectional view of the seal ring taken along 7-7 indicated in FIG. 6.
Figure 8:
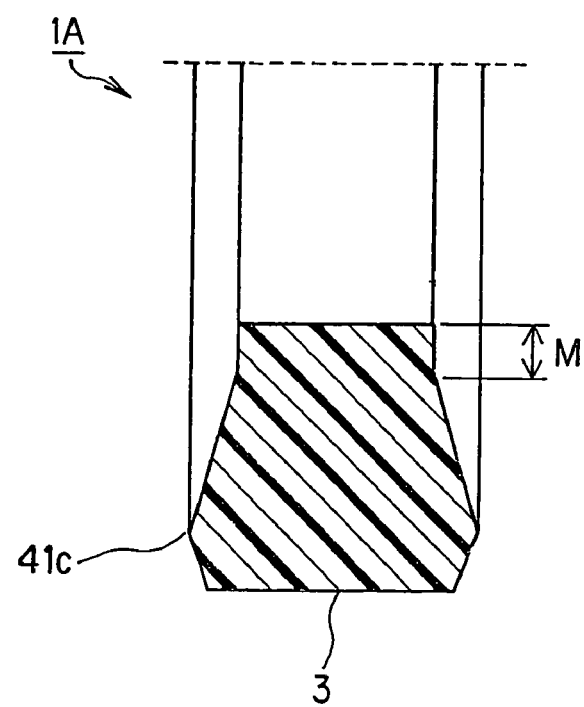
FIG. 8 is a sectional view of the seal ring taken along 8-8 indicated in FIG. 6.

Here, in order to enhance the mold releasability, a flat surface M which is flattened in the diametric direction may well be provided on the inner peripheral side as shown in FIGS. 6-8.

FIG. 6 is a plan view showing a seal ring 1A whose mold releasability has been enhanced, FIG. 7 is a sectional view of the seal ring 1A taken along 7-7 indicated in FIG. 6, and FIG. 8 is a sectional view of the seal ring 1A taken along 8-8 indicated in FIG. 6.

In releasing a mold, a releasing ejector pin is caused to abut against the flat surface M, whereby the ejector pin does not abut against any inclination surface constituting the linear contact portion 41, and hence, the mold can be released without spoiling the shape of the seal ring.

Besides, a resin composite which consists of a heat-resisting resin and a filler is applicable as a material which constructs the seal ring 1.

Here, mentioned as the heat-resisting resin is a resin which is excellent in heat resistance, burning resistance and resistance to chemicals, and which exhibits an excellent mechanical property, for example, a polycyanoaryl ether type resin (PEN), a polyether etherketone (PEEK) resin or the like aromatic polyether ketone resin, an aromatic type thermoplastic polyimide resin, a polyamide 4-6 type resin, a polyphenylene sulfide type resin, or a polytetrafluoroethylene type resin.

Incidentally, the filler is compounded for the purposes of enhancing the mechanical strength of the material, enhancing a wear-proofness, affording a low friction characteristic, etc., and it is not especially restricted.

In the seal ring thus constructed, the first seal portion 4 is employed as the linear contact portions which come into linear contact with the sidewall surface 72 of the annular groove 71, so that the pressure receiving area of the sliding portion can be decreased. Accordingly, the formation of the lubricating film by the lubricating oil can be made favorable, and the reduction of the rotational sliding friction can be attained. Besides, even if the foreign matter has intruded into the sliding portion, it can be easily vomited.

Further, it is permitted to control the quantity of leakage in accordance with the size of the gap which is formed owing to the fact that the linear contact portions are provided at the diametric distance in the separation portion.

The "size of the gap which is formed owing to the fact that the linear contact portions are provided at the diametric distance in the separation portion" signifies the sectional part S stated before, and the quantity of leakage can be controlled by adjusting the dimensions a, b and c.

Further, the linear contact portions 41a and 41b respectively provided at the convex part 21 and the concave part 24 lie so as to be placed one over the other when projected in the diametric direction, whereby the space which is formed by these linear contact portions 41a, 41b, the end surface 48 of the convex part 21 on the unsealed fluid side A and the sidewall surface 72 of the annular groove 71 becomes columnar, that is, the leakage path R becomes columnar. Accordingly, the oil passing resistance of this region can be enlarged, so that the quantity of leakage can be reduced still more.

Besides, the quantity of leakage can be controlled by adjusting this region, in other words, that length in the circumferential direction over which the linear contact portions 41a and 41b respectively provided at the convex part 21 and the concave part 24 are placed one over the other when projected in the diametric direction.

Also in a case where an equivalent leakage-path sectional area is set for, for example, the seal ring 400 as shown in FIGS. 41 and 42 in the paragraph of the prior art, the quantity of leakage can be reduced still more.

Second Embodiment

Figure 9:
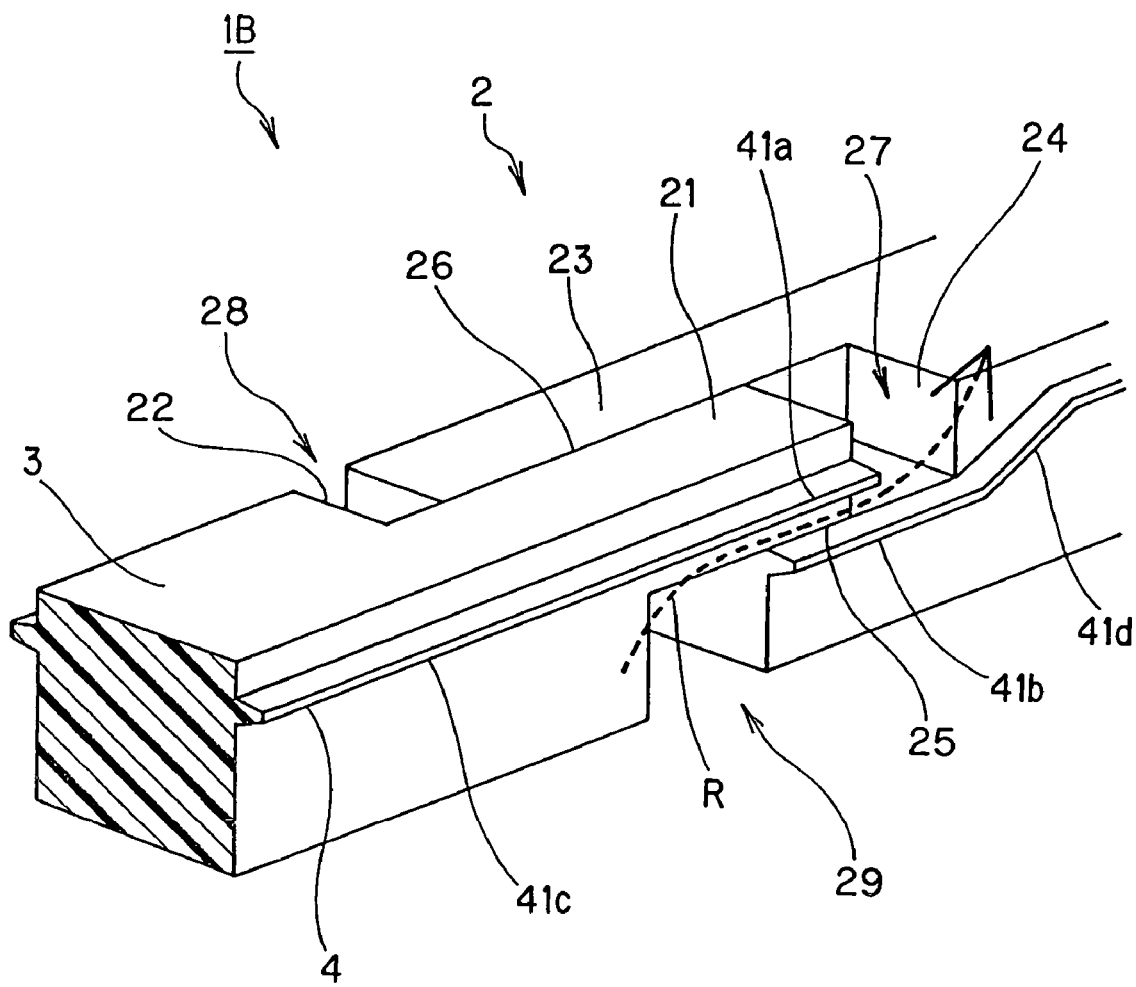
FIG. 9 is a perspective view, partly broken away, showing the mounted state of a seal ring according to the second embodiment of the invention.
Figure 10:
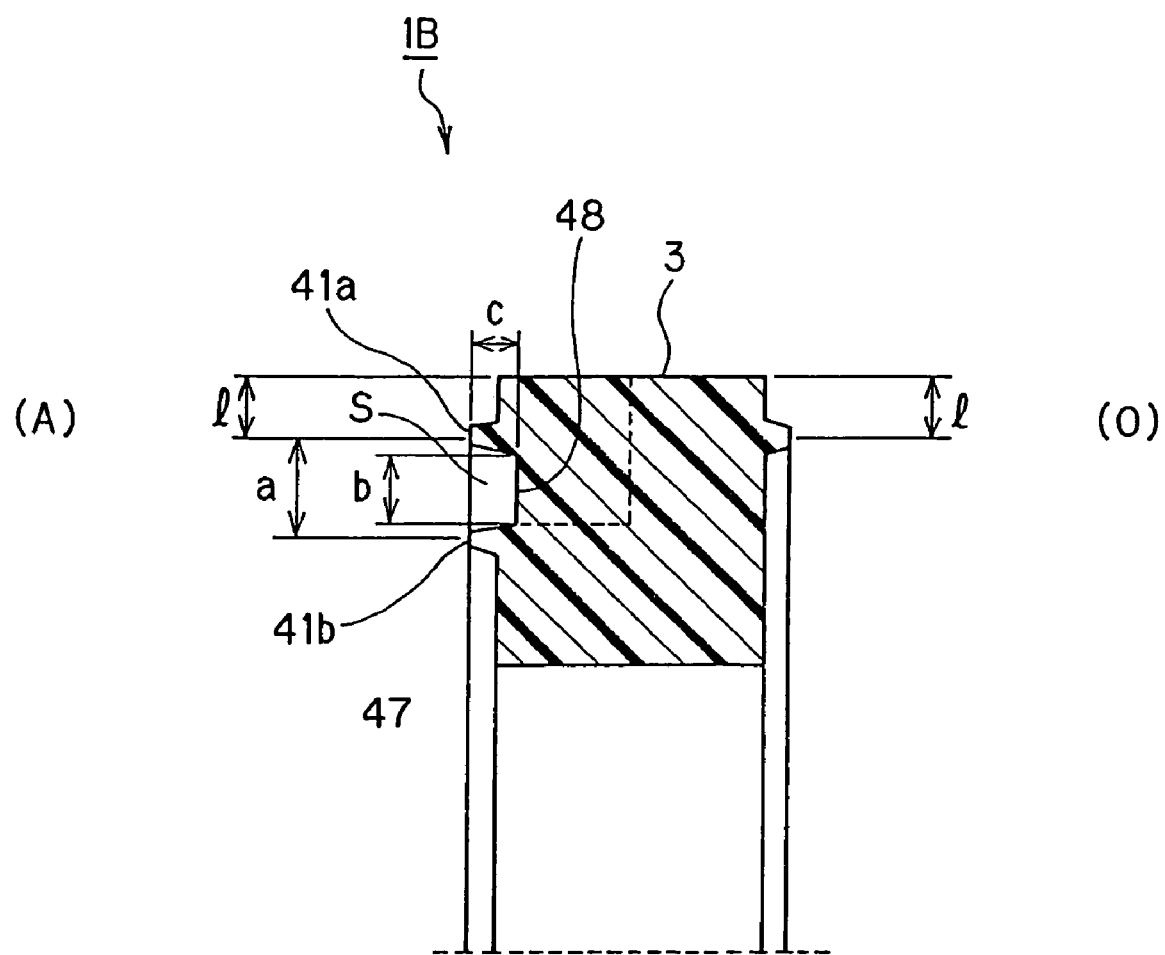
FIG. 10 is a sectional view of a separation portion (corresponding to the section 3-3 of the seal ring shown in FIG. 1)
Figure 11:
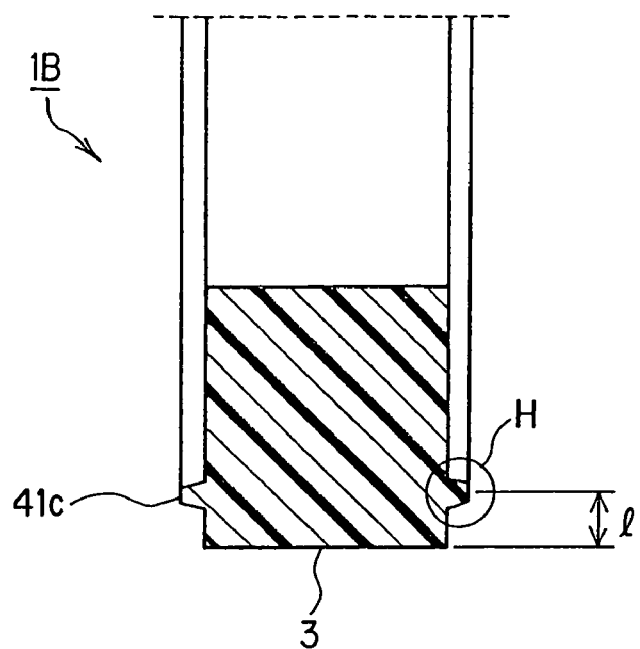
FIG. 11 is a sectional view corresponding to the section 4-4 of the seal ring shown in FIG. 1.
Figure 12:
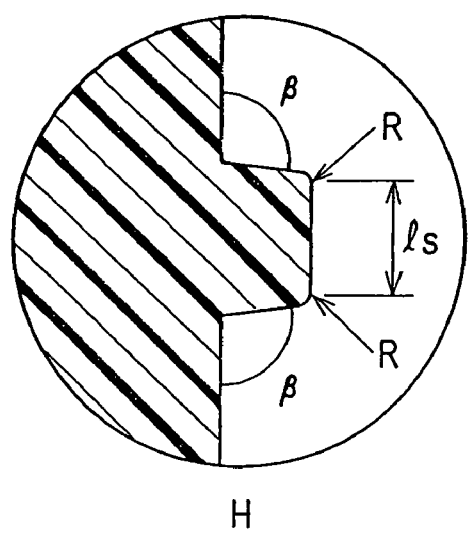
FIG. 12 is an enlarged view of a part H in FIG. 11.

A seal ring 1B according to the second embodiment of the present invention will be described with reference to FIG. 9-FIG. 12. FIG. 9 is a perspective view, partly broken away, showing the mounted state of the seal ring 1B according to this embodiment, FIG. 10 is a sectional view of a separation portion (corresponding to the section 3-3 of the seal ring 1 shown in FIG. 1), FIG. 11 is a sectional view corresponding to the section 4-4 of the seal ring shown in FIG. 1, and FIG. 12 is an enlarged view of a part H in FIG. 11.

As compared with the seal ring 1 according to the first embodiment, this embodiment consists in that the sectional shape of the seal ring is made substantially rectangular, and that the side surface of substantially rectangular section on the unsealed fluid side A is provided with linear contact portions which come into linear contact with the sidewall surface 72 of an annular groove 71. Incidentally, identical numerals and signs are assigned to the same constituents as in the first embodiment, and they shall be omitted from description.

In the seal ring 1B according to this embodiment, a first seal portion 4 is constructed of linear contact portions 41 which protrude from the side surface of the seal ring of substantially rectangular section on the unsealed fluid side A, toward the sidewall surface 72 of the annular groove 71, and which come into linear contact with the sidewall surface 72.

In that region of the seal ring 1B which is not formed with the separation portion 2, the linear contact portion 41 is constructed of an mountain shaped portion protruding toward the sidewall surface 72 of the annular groove 71, at the position of a length l on the inside diameter side of the seal ring from the corner of a second seal portion 3 on the unsealed fluid side A.

Besides, at a convex part 21, the linear contact portion 41 is constructed of an mountain shaped portion which protrudes toward the sidewall surface 72 of the annular groove 71, at the position of the length l on the inside diameter side from the corner of the second seal portion 3 on the unsealed fluid side A.

Besides, at a concave part 24, the linear contact portion 41 is constructed of an mountain shaped portion which protrudes from the separation surface 25 of the concave part 24 on the unsealed fluid side A, and from the side surface of the seal ring on the unsealed fluid side A.

Here, as in the first embodiment, the linear contact portion 41 which is provided at the convex part 21 shall be described as a linear contact portion 41a, the linear contact portion 41 which is provided at the concave part 24 shall be described as a linear contact portion 41b, and the linear contact portion 41 which is provided in the region of the seal ring 1B which is not formed with the separation portion 2 shall be described as a linear contact portion 41c.

Besides, the linear contact portions 41a, 41b and 41c are continuously provided in the first seal portion 4, and the linear contact portions 41a and 41b are provided at a diametric distance in the separation portion 2 as shown in the figures, whereby a leakage path R (refer to FIG. 9) is formed between the linear contact portions 41a and 41b.

Here, the sectional shape of the linear contact portions in the separation portion of the seal ring will be described with reference to FIG. 10.

Referring to FIG. 10, a is let denote the length between the linear contact portions 41a and 41b in the diametric direction of the seal ring, b the diametric length of an end surface 48 in the side surface of the convex part 21 on the unsealed fluid side A, from the corner 47 of an end part in the inside diameter side of the seal ring, to the rise of the mountain shaped portion of the linear contact portion 41a (boundary between the side surface and the mountain shaped portion), c an axial length from the linear contact portion 41 to the end surface 48 of the convex part 21 on the unsealed fluid side A, S a sectional part which is determined by the dimensions a, b and c, and l a diametric length from the second seal portion 3 to the linear contact portion 41a (or linear contact portion 41c).

Besides, it is permitted to control the quantity of leakage, by appropriately adjusting the area of the sectional part S which is determined by the dimensions a, b and c.

"Adjusting the area of the sectional part S" is to adjust the dimensions a, b and c. Here, the dimension a, dimension b, dimension c and dimension l are the same as in the first embodiment.

FIG. 12 is the enlarged view of the part H in FIG. 11, and the linear contact portion 41 is enlarged therein. As shown in FIG. 12, the distal end of the linear contact portion 41 has a predetermined width in the diametric direction. The width ls should favorably be set at 0.05-0.3 mm, preferably 0.1-0.2 mm, in consideration of the suppression of the leakage quantity and the vomitability or eliminability of the foreign matter. Besides, both the ends of the linear contact portion 41 should favorably be chamfered to R0.1 or less.

Besides, the angle β of the rise of the mountain shaped portion constructing the linear contact portion 41 as measured from the side surface of the ring should suitably be 90 degrees<β<180 degrees, preferably 95 degrees<β<120 degrees in consideration of the releasability of a mold.

As described above, according to this embodiment, the same advantages as in the first embodiment can be attained. Furthermore, since the linear contact portions are provided on the side surfaces of the seal ring of substantially rectangular section, the work of the mold becomes simple and easy, and the mold releasability is enhanced without providing the flat surface of the first embodiment as shown in FIGS. 6-8.

EXAMPLE 1

A more practicable example will be described on the seal ring according to the first embodiment.

Figure 34:
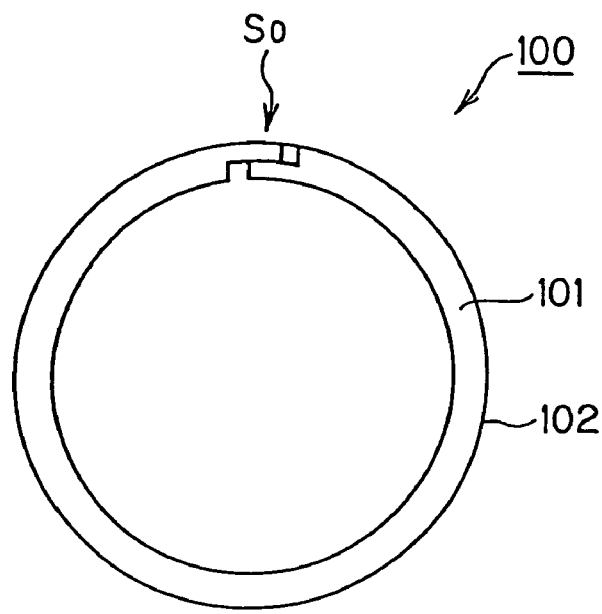
FIG. 34 is a view showing a seal ring according to a prior-art technique.
Figure 35:
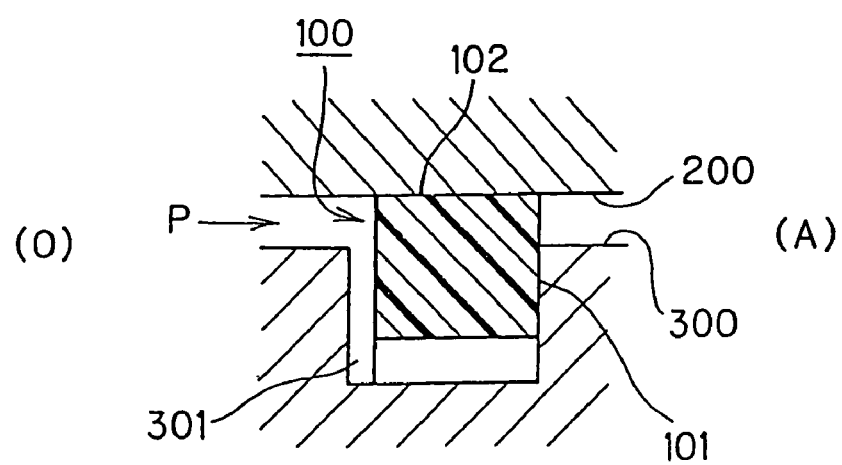
FIG. 35 is a view showing the seal ring according to the prior-art technique.

First, as a Comparative Example 1, there was used the seal ring 100 of substantially rectangular section fabricated by injection molding with polyether etherketone (PEEK) in which several sorts of fillers were compounded (seal ring shown in FIGS. 34 and 35 as explained in the paragraph of the prior art).

Besides, in this example, the seal ring 100 molded as the Comparative Example 1 was additionally worked to obtain the seal ring 1 shown in FIGS. 1-5 in the first embodiment.

Here, the dimensions of the individual parts of the seal ring 1 were set at seal-ring outside diameter=47.85 mm, seal-ring wall thickness 1.9 mm, seal-ring height 2 mm, l=0.6 mm, θ1=about 15 degrees, θ2=about 15 degrees, b=0.25 mm, c=0.25 mm, and ls=0.2 mm.

Figure 38:
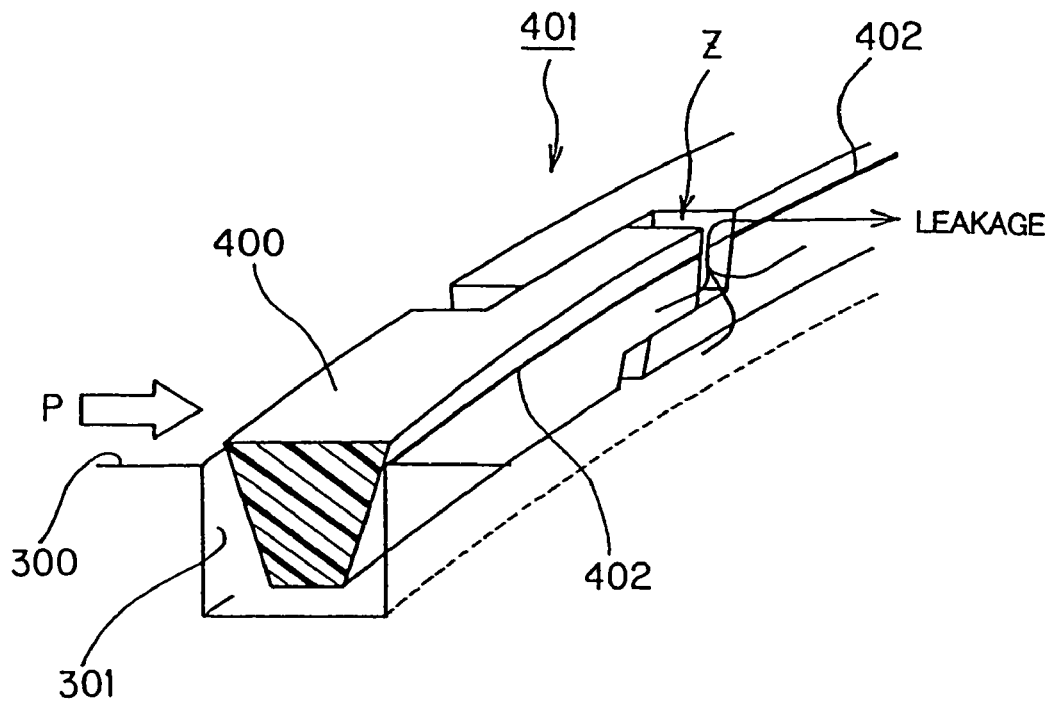
FIG. 38 is a view showing a seal ring according to a prior-art technique.
Figure 39:
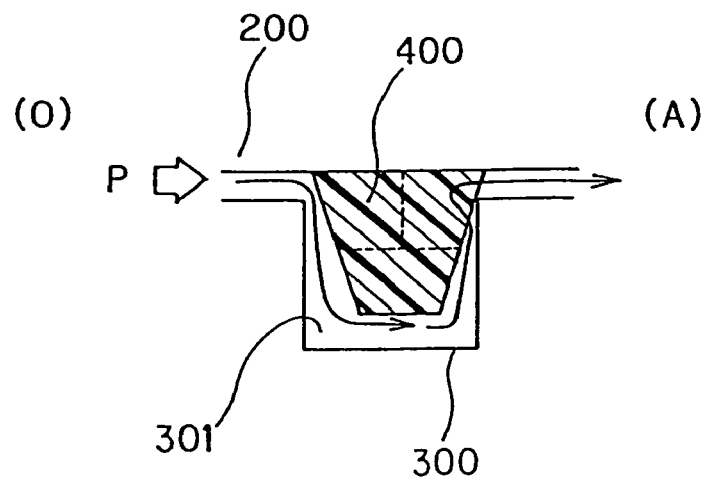
FIG. 39 is a view showing the seal ring according to the prior-art technique.

Besides, as a Comparative Example 2, there was used a seal ring 400 fabricated by additionally working the seal ring 100 molded as the Comparative Example 1 (seal ring shown in FIGS. 38 and 39 as explained in the paragraph of the prior art).

Incidentally, the seal-ring outside diameters, wall thicknesses and heights were equal in all of this example and the Comparative Examples 1 and 2, and the separation portions (in the shape of daggers) were the special step cuts in all of this example and the Comparative Examples 1 and 2.

Endurance tests were conducted using the three kinds of seal rings.

Conditions were set at an inflow oil temperature=80° C., oil pressure=1.3 MPa, rotational frequency of the shaft=4000 rpm, peripheral speed=10 m/s, oil type=ATF, material of the side surface of the shaft=ADC12, material of the housing=S45C, and test time=144 hours. As the foreign matter, Testing dust type-7 (Kanto loam) stipulated in "JIS Z 8901", in amounts of 10 mg, was thrown into pipes located just in front of the mounted portions of the seal rings, at intervals of 24 hours.

The results of the tests are indicated in Table 1. Incidentally, 1000 cc/min=1 l/min holds.

TABLE 1

| | Maximum wear depth of Side surface of Aluminum shaft (μm) | Quantity of leakage at Start of Test (cc/min) | Quantity of leakage at End of Test (cc/min) | Remarks |
|---|---|---|---|---|
| Example | 3-4 | 130-140 | 130-140 | |
| Comparative Example 1 | 500-1400 | 10-20 | Above 1000 | Interrupted in 30 hours due to large leakage quantity |
| Comparative Example 2 | 2-4 | 300-400 | 300-400 | |

As indicated in Table 1, it has been verified that this example is much less than the Comparative Example 1 in the wear depth of the aluminum shaft, and that, when compared with the Comparative Example 2, this example realizes a nearly equal wear depth of the aluminum shaft with a leakage quantity of half or less.

Third Embodiment

Now, a seal ring 1C according to the third embodiment of the present invention will be described.

In handling the seal ring, for example, in carrying the seal ring or in assembling the seal ring into the annular interspace between the two members, the seal ring sometimes suffers from a flaw such as struck traces or pressed traces. Especially in the seal ring having the separation portion, the ends of the separation portion might flaw.

Figure 13:
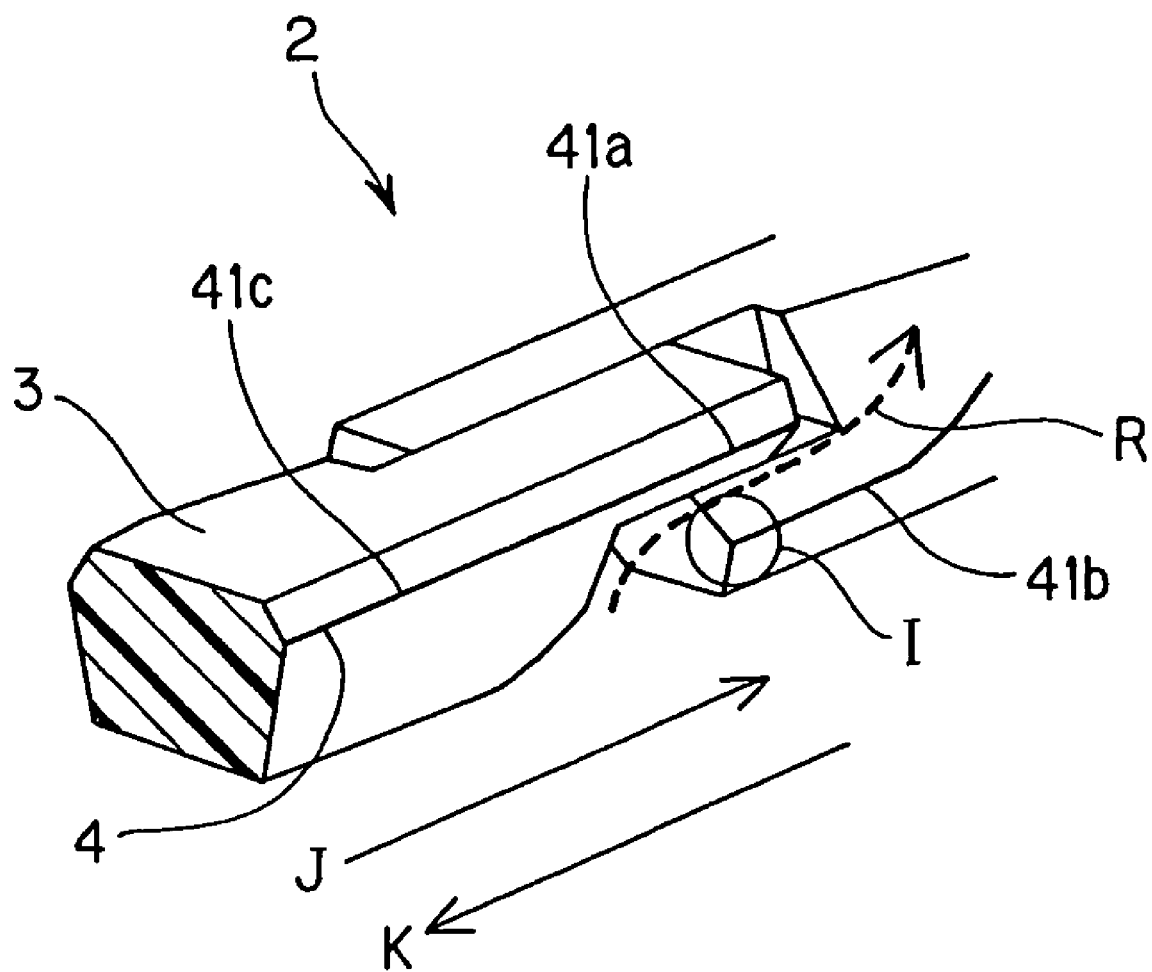
FIG. 13 is a schematic view for explaining problems, in the third embodiment of the invention.

FIG. 13 is a schematic view for explaining problems.

By way of example, in a case where the seal ring 1 according to the first embodiment has suffered from the flaw such as struck traces or pressed traces, at a part I shown in FIG. 13, any foreign matter existing in the sealed fluid becomes easy to intrude between the linear contact portions 41a and 41b from the part having flawed.

In the seal ring 1, the linear contact portions 41a and 41b are provided at the diametric distance in the separation portion 2, whereby the leakage path R is formed between these linear contact portions 41a and 41b. In a case where the direction of the leakage path R and the rotational direction of the shaft have become identical, that is, where the sliding direction of the shaft relative to the seal ring is a J-direction indicated in FIG. 13, the foreign matter existing in the sealed fluid becomes easily fed in between the linear contact portions 41a and 41b.

Especially in a case where the shaft is made of the soft material and where the sliding direction of the shaft relative to the seal ring is the J-direction indicated in FIG. 13, it is apprehended that the foreign matter fed in between the linear contact portions 41a and 41b will intervene between the gap of the linear contact portions 41a, 41b of the seal ring 1 and the sidewall surface 72 of the annular groove 71 of the shaft 70, so the sidewall surface 72 will wear away drastically.

It is therefore favorable to construct the separation portion 2 of the seal ring 1 so that the leakage path R formed between the linear contact portions 41a and 41b may be in the reverse direction to the rotational direction of the shaft, in other words, that the sliding direction of the shaft 70 may become a K-direction indicated in FIG. 13. That is, the seal ring may be mounted so that the convex part 21 for sealing the sidewall surface 72 on the unsealed fluid side A may lie on a downstream side in the sliding direction of the shaft 70.

Here, a plurality of seal rings are usually used in a set. It is therefore apprehended that the job of mounting the seal rings in accordance with the rotational direction of the shaft will incur the lowering of a job efficiency.

This embodiment elucidates the seal ring 1C in which the separation portion of the seal ring 1 according to the first embodiment is endowed with a directivity by providing a protrusive part as which the outer peripheral part of the separation portion 2 is protruded in the circumferential direction relative to the inner peripheral part thereof, and a recessed part as which the outer peripheral part of the separation portion 2 is recessed in the circumferential direction relative to the inner peripheral part thereof and into which the protrusive part is fitted.

Figure 14:
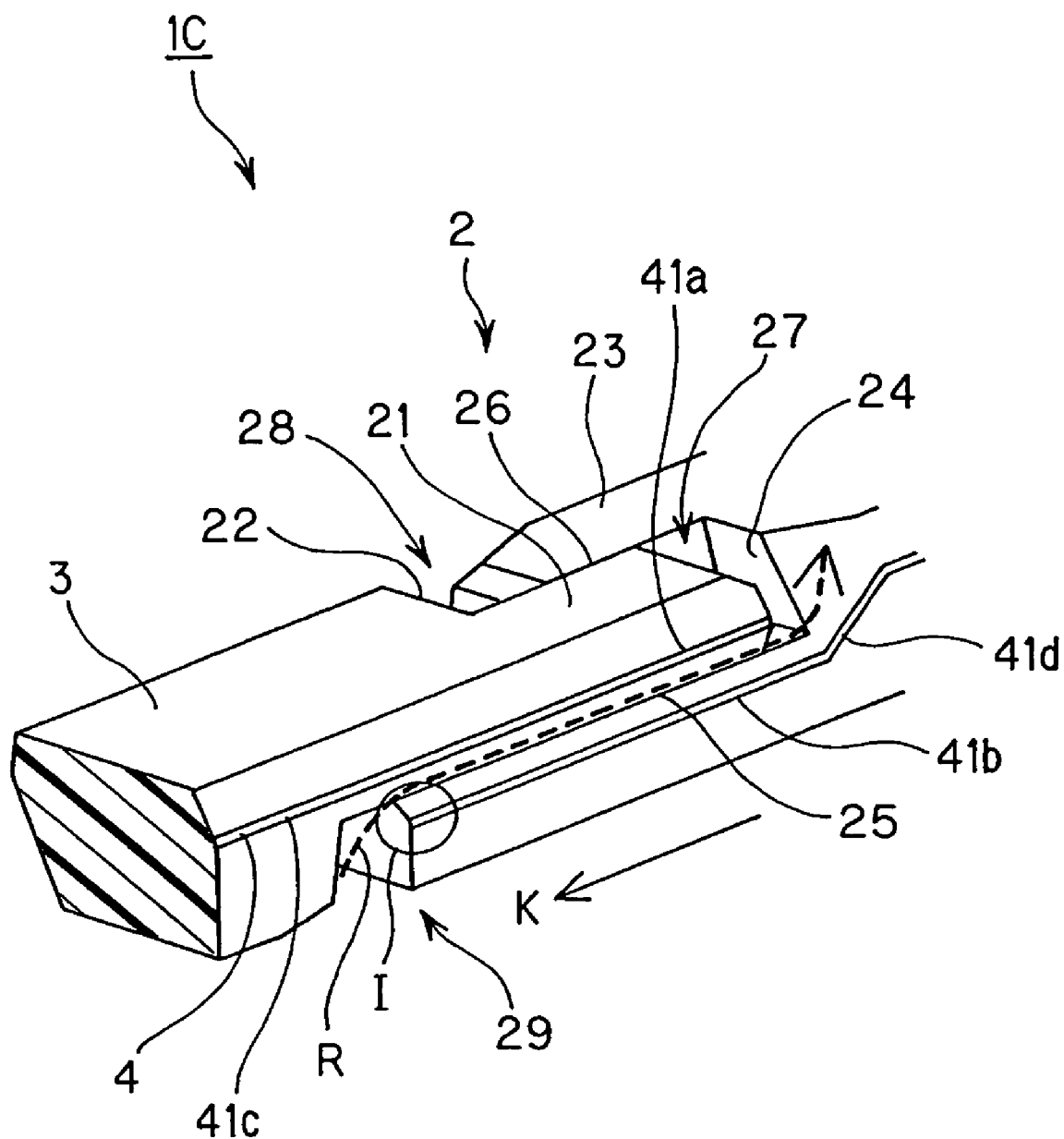
FIG. 14 is a perspective view, partly broken away, showing the mounted state of a seal ring according to the third embodiment of the invention.
Figure 15:
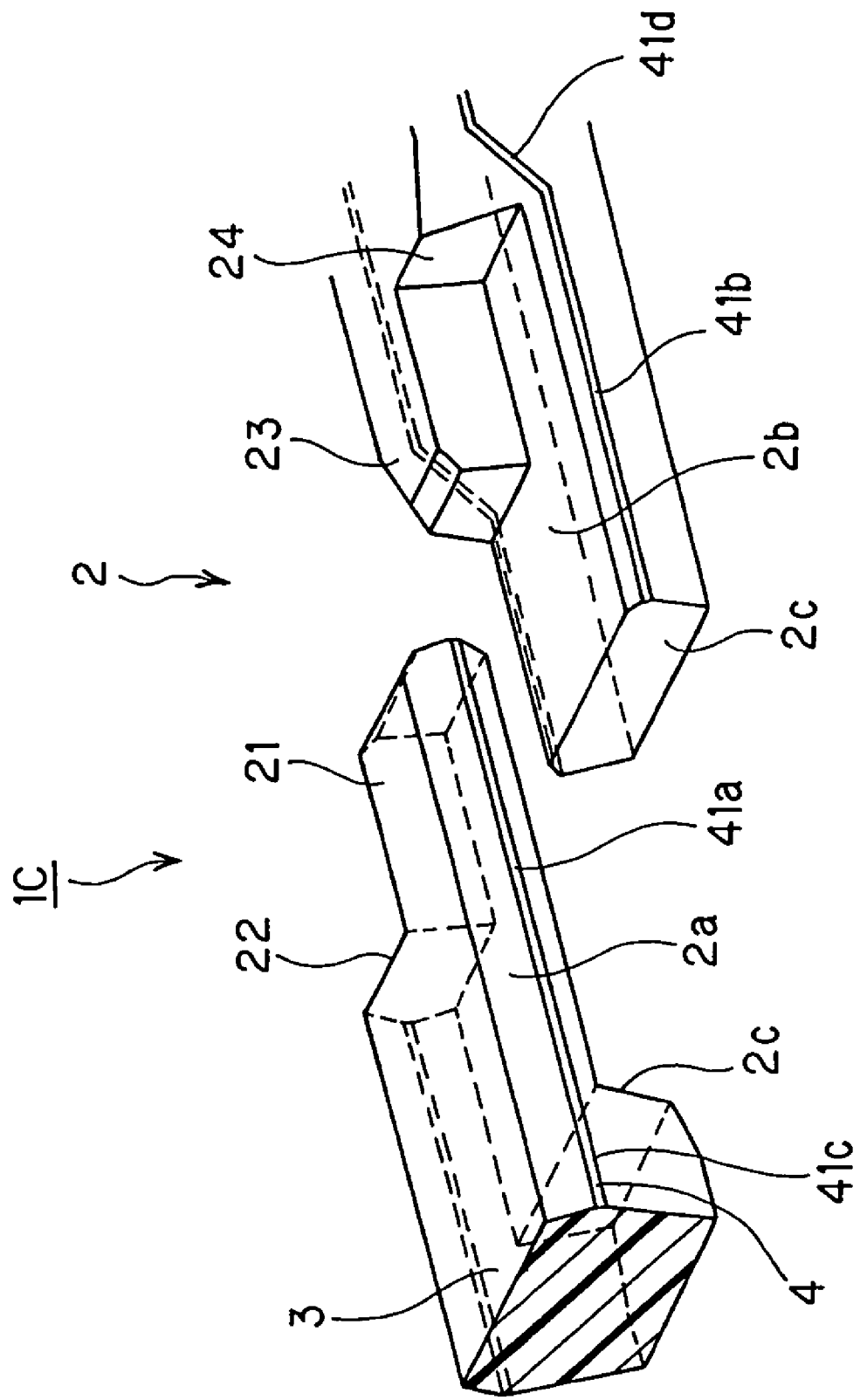
FIG. 15 is a perspective view, partly broken away, showing the spaced state of a separation portion in order to explain the construction of the separation portion of the seal ring according to the third embodiment of the invention.

FIG. 14 is a perspective view, partly broken away, showing the mounted state of the seal ring 1C according to the third embodiment of the invention, while FIG. 15 is a perspective view, partly broken away, showing the spaced state of the separation portion in order to explain the construction of the separation portion of the seal ring 1C according to this embodiment. Incidentally, identical numerals and signs are assigned to the same constituents as in the first embodiment, and they shall be omitted from description.

A special step cut adopted in the separation portion 2 of the seal ring 1C according to this embodiment includes the protrusive part 2a as which one side of the separation portion 2 on the outer peripheral side of the ring body of the seal ring is protruded in the circumferential direction relative to the inner-peripheral side end 2c of the ring body, and the recessed part 2b as which the other side is recessed relative to the inner-peripheral side end 2c of the ring body and into which the protrusive part 2a is fitted. Here, the protrusive part 2a constructs a first circularly-arcuate convex part, while the recessed part 2b constructs a first circularly-arcuate concave part.

Besides, as in the seal ring 1 according to the first embodiment, the protrusive part 2a includes a convex part 21 and a concave part 22 in a widthwise (axial direction) pair, and the recessed part 2b includes a concave part 24 and a convex part 23 in a widthwise pair. In addition, on the outer peripheral side of the seal ring 1C, the convex part 21 and the concave part 24 are fitted, and the concave part 22 and the convex part 23 are fitted. Here, the convex part 21 constructs a second circularly-arcuate convex part, while the concave part 24 constructs a second circularly-arcuate concave part.

In the seal ring 1C according to this embodiment, a first seal portion 4 is constructed of linear contact portions 41 which come into linear contact with the sidewall surface 72 of the annular groove 71. This is the same as in the seal ring 1, the linear contact portions 41a, 41b and 41c constructing the linear contact portions 41 are continuously provided in the first seal portion 4, and the linear contact portions 41a and 41b are provided at a diametric distance in the separation portion 2, whereby a leakage path R (refer to FIG. 14) is formed between the linear contact portions 41a and 41b.

Here, the sectional shape of the linear contact portions in the separation portion of the seal ring 1C is the same as in the seal ring 1.

In this embodiment, accordingly, the same advantages as in the first embodiment can be attained.

Besides, the feature of this embodiment is that, in mounting the seal ring, the seal ring 1C is mounted into the annular groove 71 of the shaft 70 in correspondence with the rotational direction of this shaft 70.

More specifically, the seal ring is disposed so that the protrusive part 2a may lie on the downstream side in the rotational direction of the shaft 70, and that the convex part 21 constructing the linear contact portion 41 at the protrusive part 2a may lie on the side of the sidewall surface 72 of the annular groove 71 provided in the shaft 70 as lies on the unsealed fluid side A.

In this manner, the convex part 21 is located on the downstream side in the rotational direction in the case where the shaft 70 rotates in the K-direction relative to the ring body as viewed in FIG. 14, whereby the direction of the leakage path R between the linear contact portions 41a and 41b and the rotational direction of the shaft become reverse to each other. The "fact that the direction of the leakage path R and the rotational direction of the shaft are reverse to each other", signifies that an opening formed by the linear contact portions 41a and 41b lies in the K-direction being the rotational direction of the shaft, on the inner peripheral side of the ring body.

Thus, even when the seal ring has been mounted in the state where it partly suffers from the flaw such as struck traces or pressed traces, at a part I, the foreign matter existing in the sealed fluid is not fed in between the linear contact portions 41a and 41b by the rotation of the shaft.

Accordingly, the foreign matter can be prevented from intervening between the gap of the linear contact portions 41a, 41b of the seal ring 1C and the sidewall surface 72 of the annular groove 71 of the shaft 70, and hence, it is permitted to prevent the sidewall surface 72 from wearing away.

Further, in the separation portion 2 of the seal ring 1C, the protrusive part 2a and the recessed part 2b which are respectively protrusive and recessed relative to the inner-peripheral side end 2c are provided on the outer peripheral side of the ring body, whereby the separation portion is endowed with the directivity unlike the substantially symmetric shape as in the seal ring 1 according to the first embodiment, and the seal ring is permitted to be reliably mounted with the protrusive part 2a located on the downstream side in the rotational direction of the shaft.

Here, the convex part 21 protruded at the protrusive part 2a should favorably lie on the unsealed fluid side A. Since, however, the outer peripheral side of the ring body is protruded in this embodiment, the direction of the leakage path R between the linear contact portions and the rotational direction of the shaft become reverse to each other even when the concave part 22 lies on the unsealed fluid side A, so that the prevention of the intrusion of the foreign matter and the prevention of the wear of the sidewall surface 72 are permitted.

Accordingly, the prevention of the intrusion of the foreign matter and the prevention of the wear of the sidewall surface 72 are reliably permitted by mounting the protrusive part 2a on the downstream side in the rotational direction of the shaft. Further, it is permitted to efficiently perform the mounting job of the seal ring in accordance with the rotational direction of the shaft.

Here, as a dimensional difference in the circumferential direction is larger at the convex part 21 and the concave part 22 (or the concave part 24 and the convex part 23 which are fitted therewith, respectively), that is, as the convex part 21 is more protrusive in the circumferential direction, the quantity of leakage of a sealed fluid can be made smaller. Since, however, this place is less influential on the quantity of leakage as compared with the sectional part S explained in the first embodiment, the dimensional difference need not be especially stipulated.

Also in the seal ring 1C, a flat surface M which is flattened in the diametric direction may be provided on the inner peripheral side as in the seal ring 1A described with reference to FIGS. 6-8, whereby the enhancement of a mold releasability can be attained.

Fourth Embodiment

Now, a seal ring 1D according to the fourth embodiment of the present invention will be described.

Figure 16:
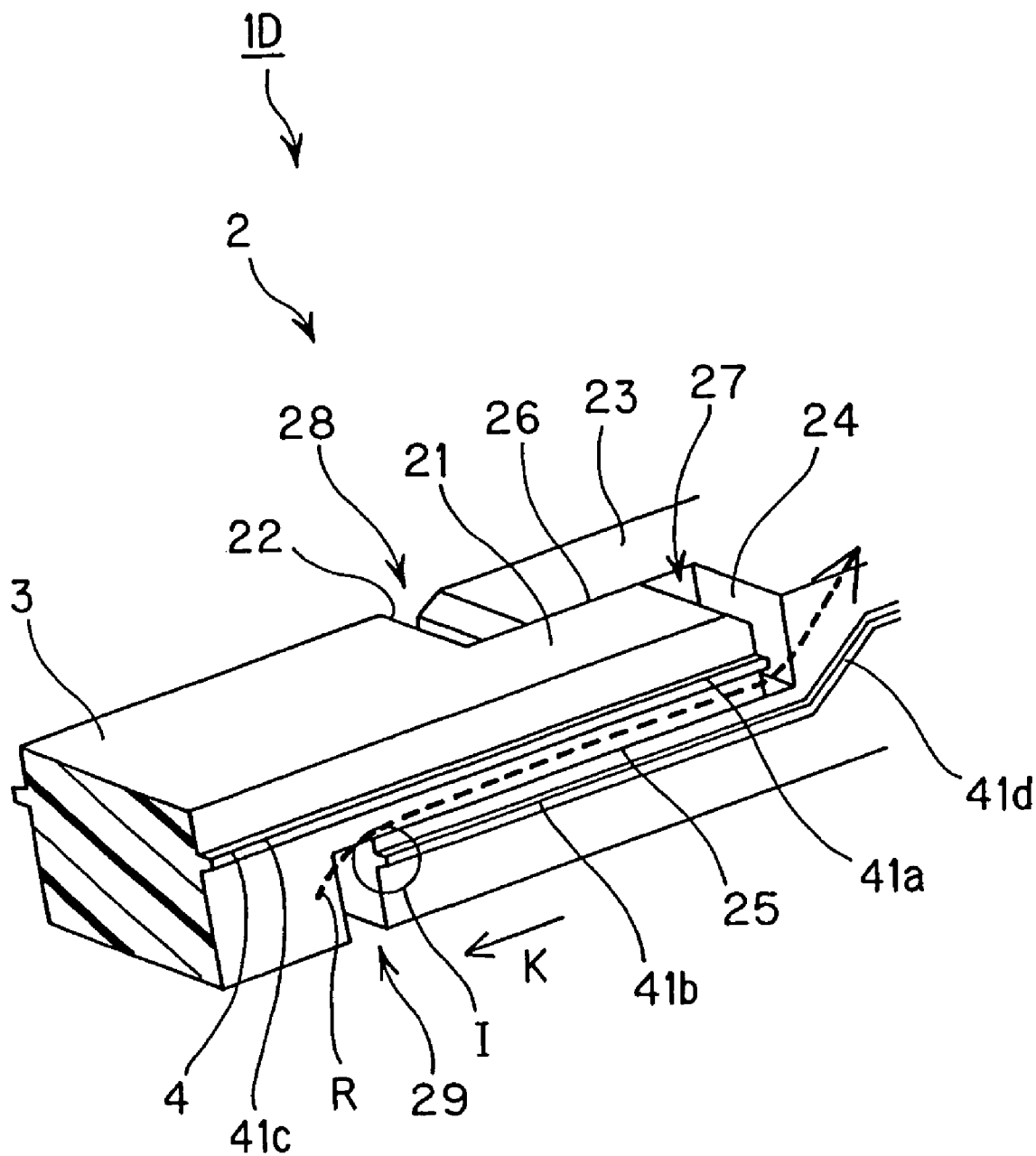
FIG. 16 is a perspective view, partly broken away, showing the mounted state of a seal ring according to the fourth embodiment of the invention.
Figure 17:
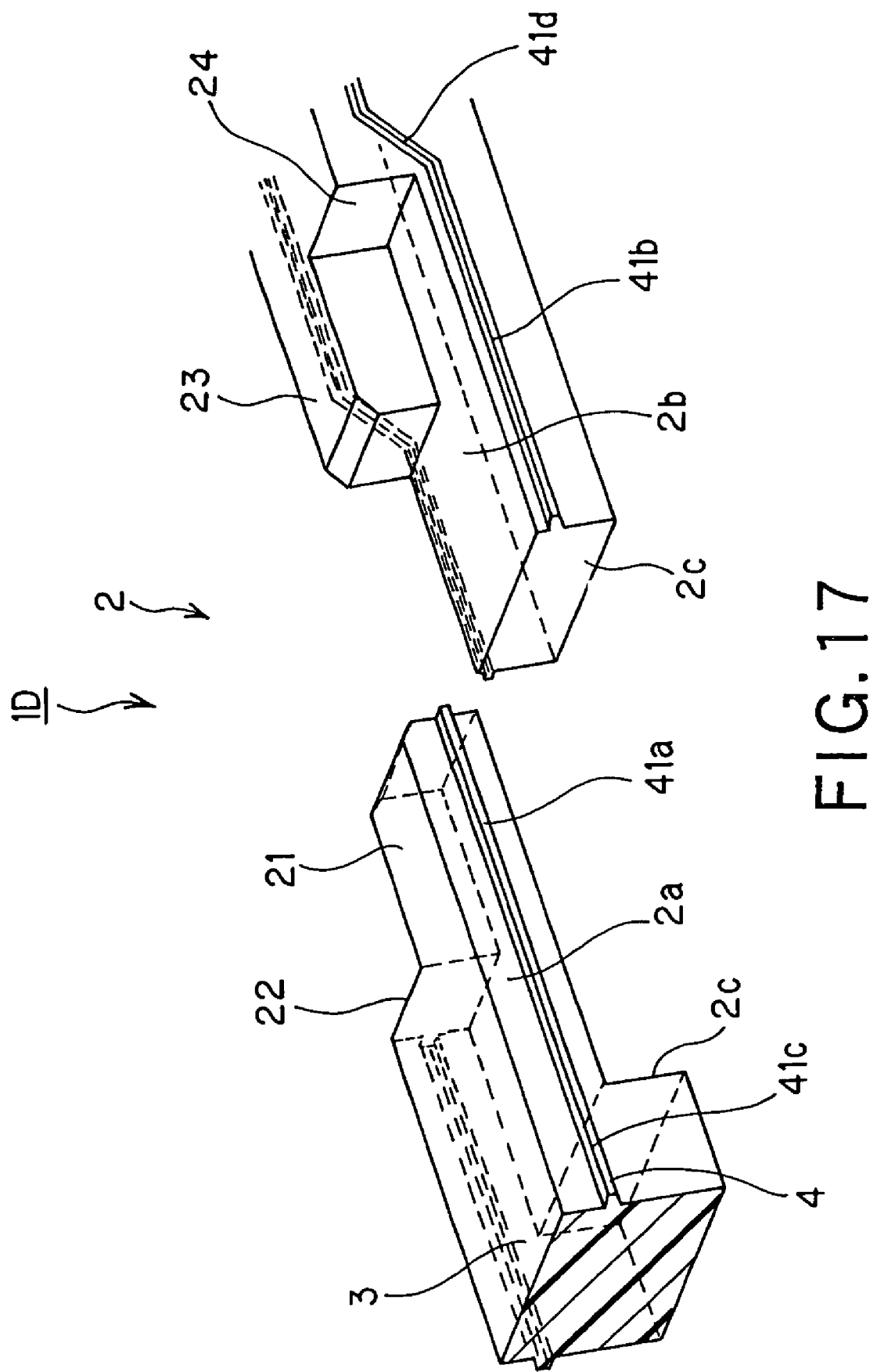
FIG. 17 is a perspective view, partly broken away, showing the spaced state of a separation portion in order to explain the construction of the separation portion of the seal ring according to the fourth embodiment of the invention.

FIG. 16 is a perspective view, partly broken away, showing the mounted state of the seal ring 1D according to the fourth embodiment of the invention, while FIG. 17 is a perspective view, partly broken away, showing the spaced state of a separation portion in order to explain the construction of the separation portion of the seal ring 1D according to this embodiment. Incidentally, identical numerals and signs are assigned to the same constituents as in the foregoing embodiments, and they shall be omitted from description.

As compared with the seal ring 1C according to the third embodiment, this embodiment consists in that the sectional shape of the seal ring is made substantially rectangular as in the seal ring 1B described in the second embodiment, and that the side surface of the seal ring of substantially rectangular section on the unsealed fluid side A is provided with linear contact portions which come into linear contact with the sidewall surface 72 of an annular groove 71.

That is, in the seal ring 1D according to this embodiment, the sectional shape is substantially rectangular, and a protrusive part as which the outer peripheral side of the separation portion 2 is protruded in the circumferential direction relative to the inner-peripheral side part thereof, and a recessed part as which the outer peripheral side of the separation portion is recessed in the circumferential direction relative to the inner-peripheral side part thereof and into which the protrusive part is fitted, are provided as in the seal ring 1C according to the third embodiment, whereby the separation portion of the seal ring 1B according to the second embodiment is endowed with a directivity.

EXAMPLE 2

A more practicable example will be described on the seal ring according to the third embodiment.

First, as a Comparative Example, the seal ring 1 shown in FIGS. 1-5 in the first embodiment was obtained as in Example 1.

Besides, in this example, the seal ring 1C shown in FIGS. 14-15 in the third embodiment was obtained by performing additional work after injection molding with polyether etherketone (PEEK) in which several sorts of fillers were compounded.

Incidentally, the dimensions of the individual parts of the seal rings were equal in both this example and the Comparative Example, and they were the same as in Example 1.

Further, struck traces were inflicted on the part I indicated in FIG. 14, in the seal ring of this example, while struck traces were inflicted on the part I indicated in FIG. 13, in the seal ring of the Comparative Example.

Using the two kinds of seal rings, endurance tests were conducted by an endurance test equipment. Two samples were used in one time of test, and an oil pressure was fed between the samples.

Figure 18:
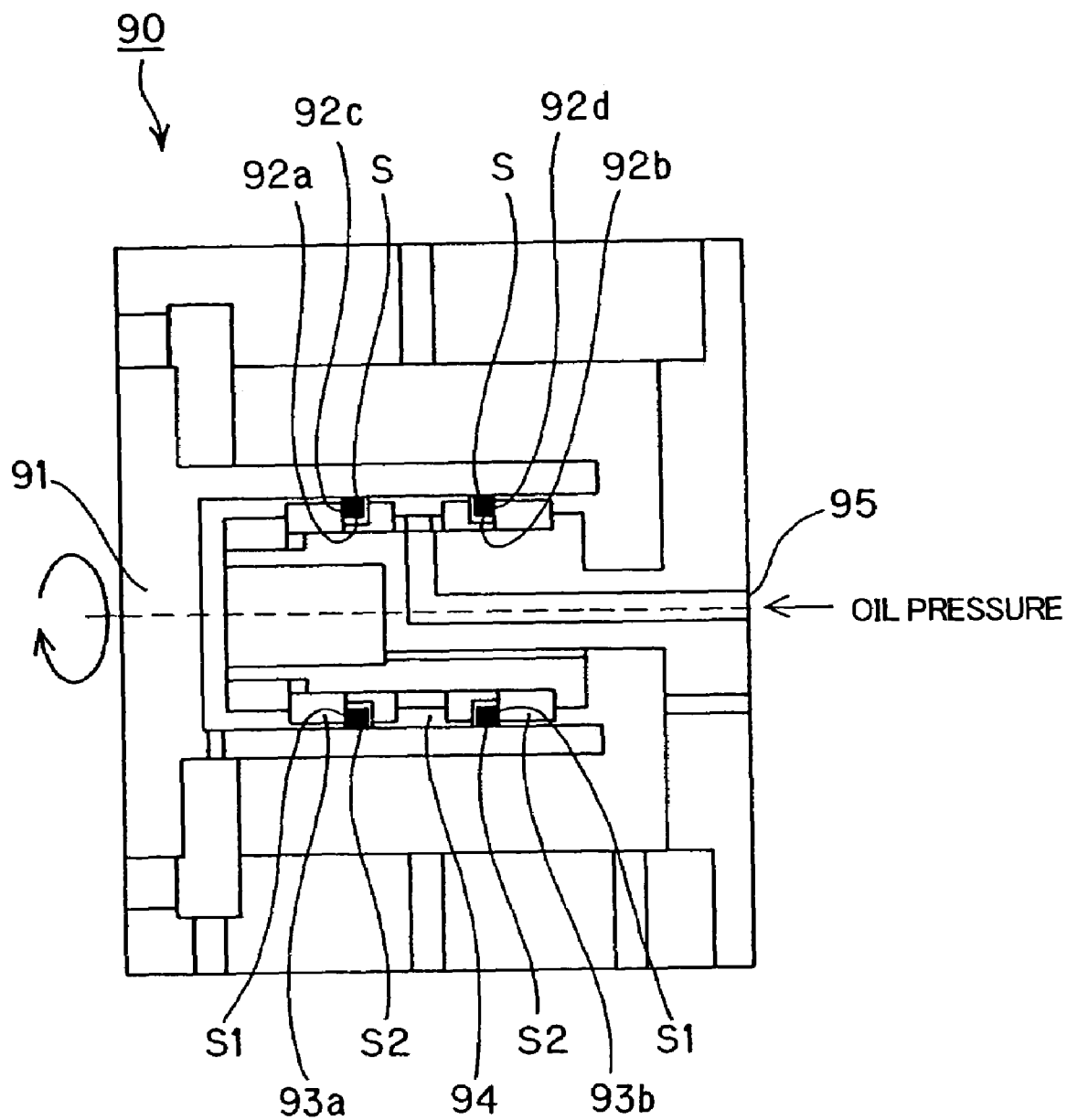
FIG. 18 is a schematic view showing an example of an endurance test equipment.

FIG. 18 is a schematic view showing an example of the endurance test equipment.

The endurance test equipment 90 shown in FIG. 18 is provided with a housing 91, and shafts 93a and 93b which are rotatably mounted on the inner periphery of the housing 91.

Ring slots 92a and 92b for mounting the seal ring samples S therein are provided in the outer peripheries of the shafts 93a and 93b, a space between the shafts 93a and 93b defines an oil chamber 94 into which testing oil is introduced, and the oil pressure is introduced from an oil-pressure introduction port 95 into the oil chamber 94.

Herein, when the oil pressure is applied with the seal ring samples S mounted in the ring slots 92a and 92b of the respective shafts 93a and 93b, the oil is tightly enclosed in a state where the ring side surfaces S1 of the respective seal ring samples S are pushed against slot side surfaces 92c and 92d, and where the ring outer-peripheral surfaces S2 thereof are pushed against the housing 91.

The results of the tests conducted under the same conditions as in Example 1 are indicated in Table 2.

TABLE 2

|  | Mounted position of Seal Ring | Maximum wear depth of Side surface of Aluminum shaft (μm) | Quantity of leakage at Start of Test (cc/min) | Quantity of leakage at End of Test (cc/min) | Sliding direction of Shaft |
|---|---|---|---|---|---|
| Example | Ring slot 202a | 2 | 120 | 120 | K-direction in FIG. 14 |
|  | Ring slot 202b | 4 | 130 | 130 | K-direction in FIG. 14 |
| Comparative Example | Ring slot 202a | 150 | 140 | Above 1000 | J-direction in FIG. 13 |
|  | Ring slot 202b | 2 | 140 | 140 | K-direction in FIG. 13 |

As indicated in Table 2, it has been verified that this example can make the wear depth of the aluminum shaft much less than the Comparative Example.

Fifth Embodiment

Now, a seal ring 1E according to the fifth embodiment of the present invention will be described.

During the use of a seal ring, it is apprehended that any foreign matter existing in a sealed fluid will intrude into a separation portion 2.

Figure 19A:
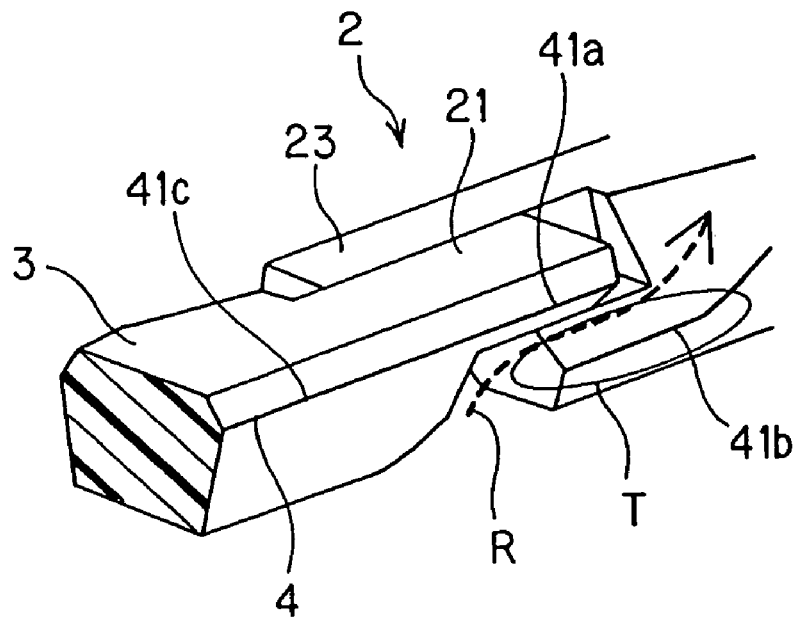
FIG. 19 is a schematic view for explaining problems, in the fifth embodiment of the invention.

FIG. 19 is a schematic view for explaining problems.

Figure 19B:
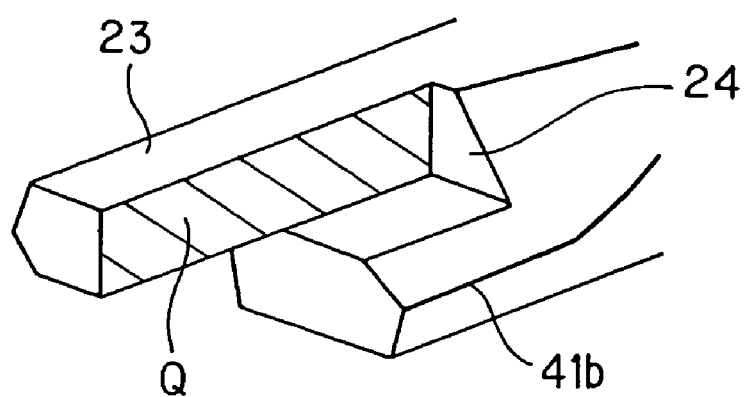

In a case where the foreign matter has intruded into the separation portion 2 in, for example, the seal ring 1 according to the first embodiment, and where such a state continues, that is, where the foreign matter has been bitten in the separation portion 2, a surface Q hatched in FIG. 19B is pushed onto the sealed fluid side O by the foreign matter, a state arises where the linear contact portion 41b (a part T indicated in FIG. 19A) does not lie in contact with a sidewall surface 72. As a result, the foreign matter existing in the sealed fluid stays between the linear contact portion 41b (the part T indicated in FIG. 19A) and the sidewall surface 72, and it might cause the drawback of wearing the sidewall surface 72, especially in a case where a shaft is made of a soft metal. Besides, excessive wear might occur in the surface Q due to the foreign matter bitten in the separation portion 2.

This embodiment elucidates the seal ring 1E having a construction which is difficult of biting the foreign matter and easy of vomiting the foreign matter even in the case where this foreign matter has intruded into the separation portion 2.

Figure 20:
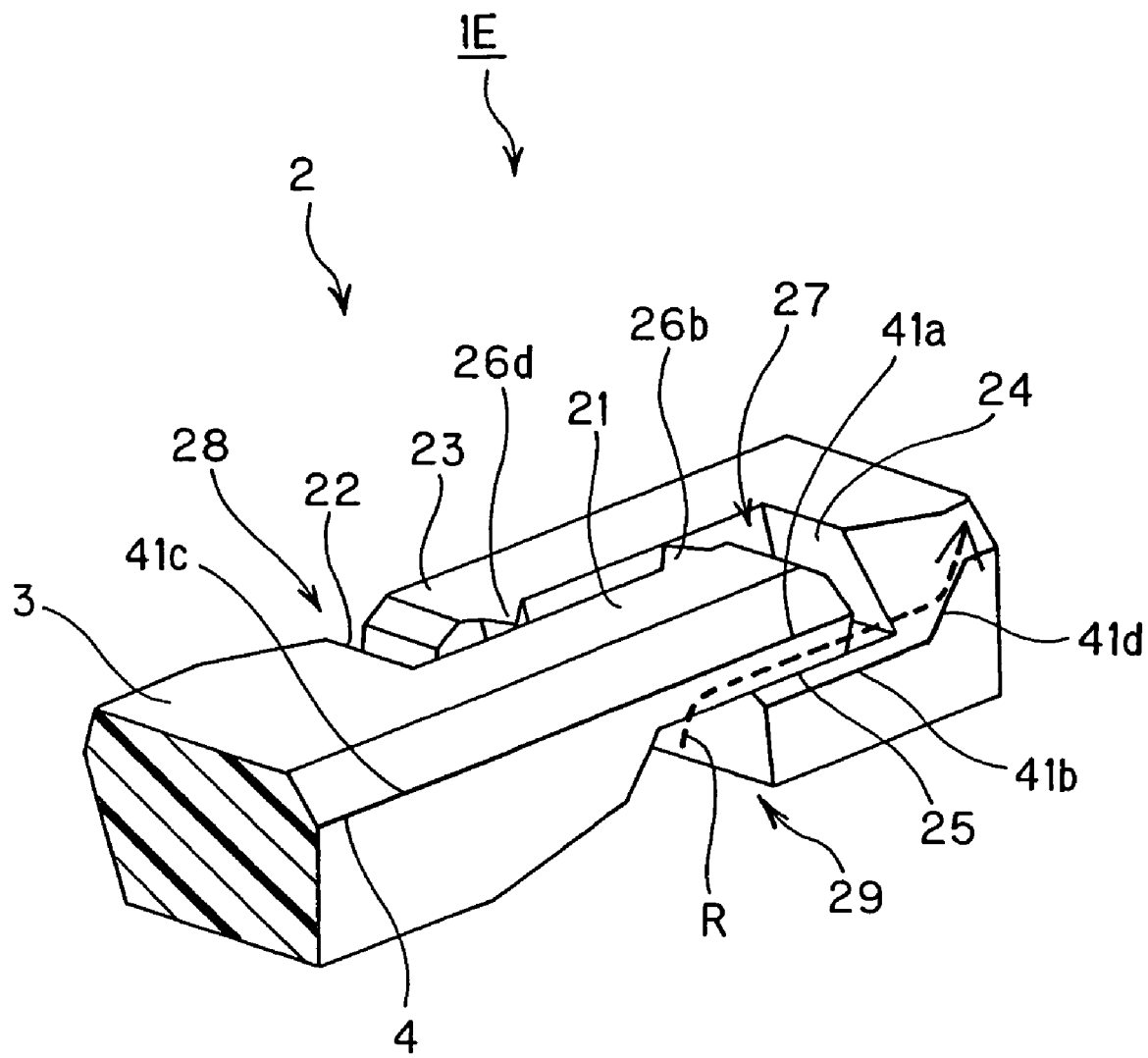
FIG. 20 is a perspective view, partly broken away, showing the mounted state of a seal ring according to the fifth embodiment of the invention.
Figure 21:
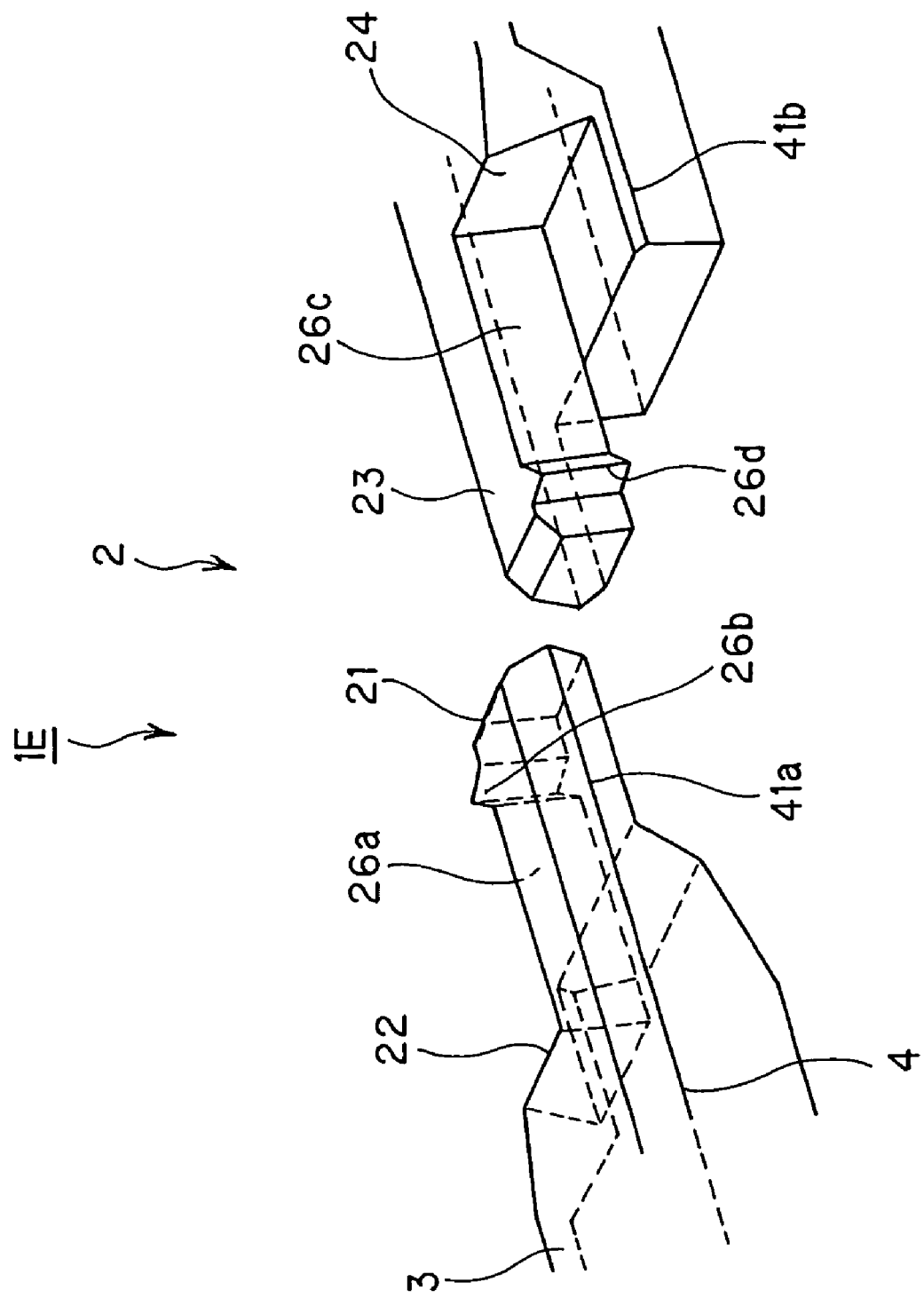
FIG. 21 is a perspective view, partly broken away, showing the spaced state of a separation portion in order to explain the construction of the separation portion of the seal ring according to the fifth embodiment of the invention.
Figure 22:
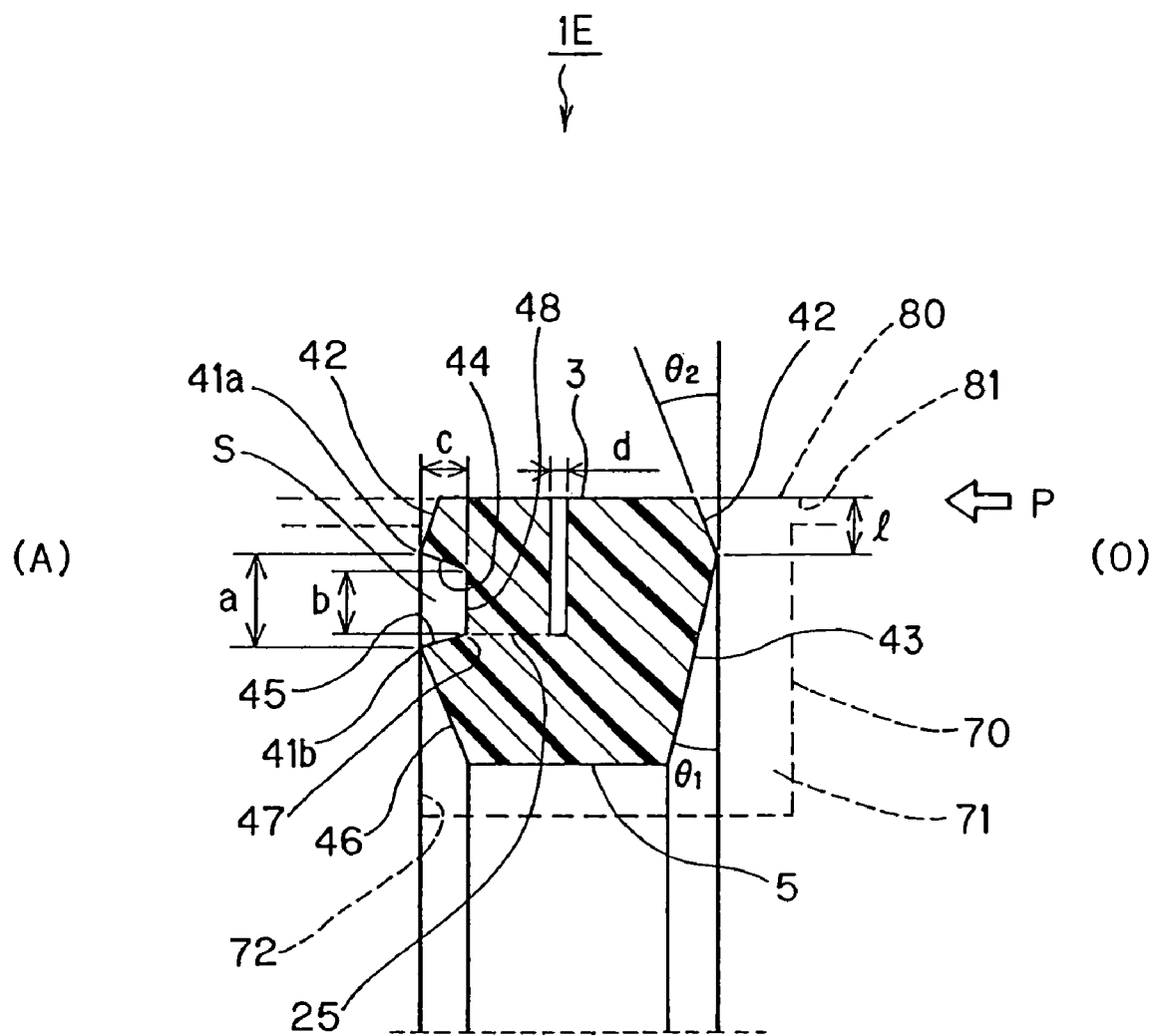
FIG. 22 is a sectional view of the separation portion (corresponding to the section 3-3 of the seal ring shown in FIG. 1)
Figure 23:
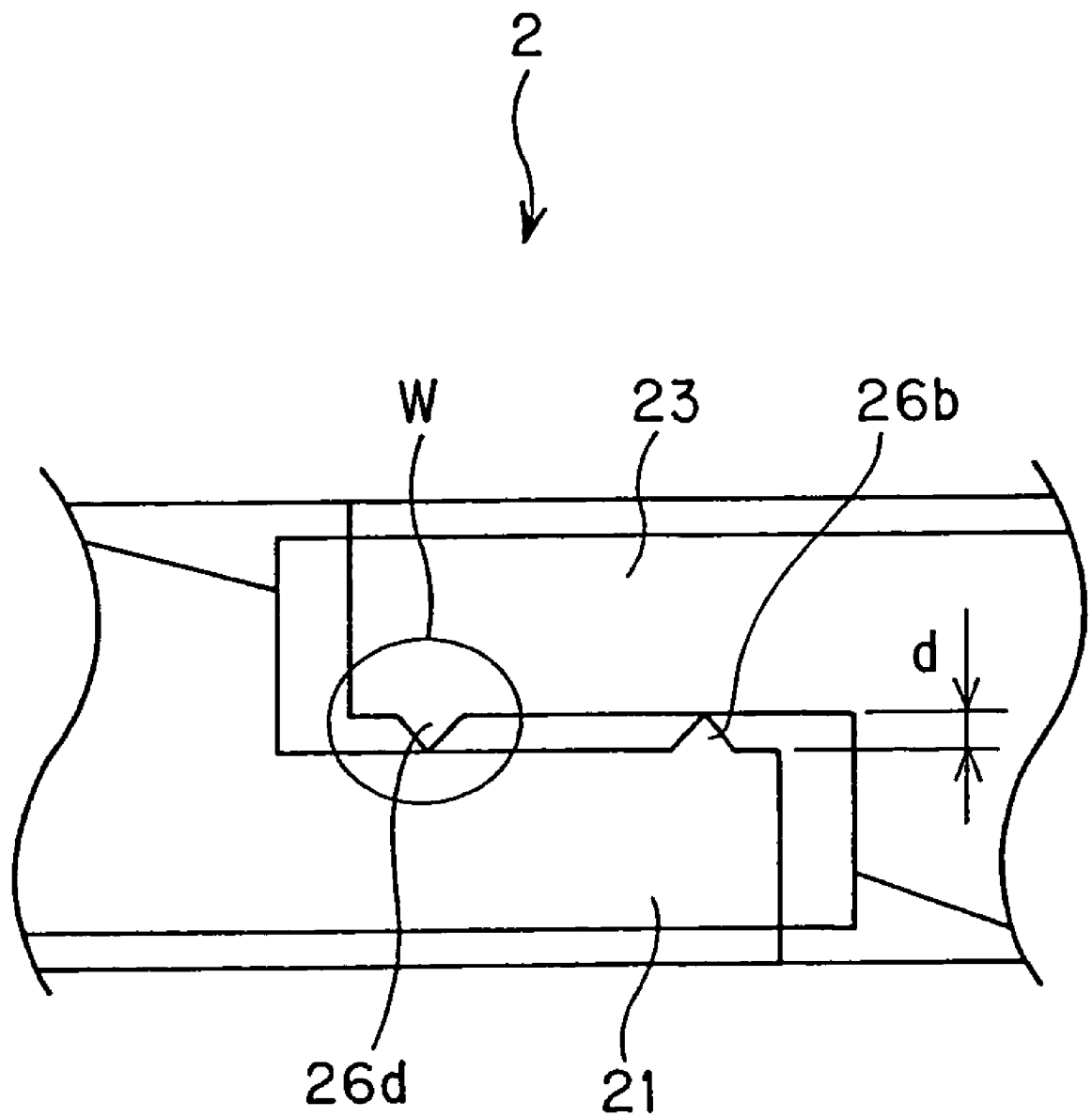
FIG. 23 is a top view, partly broken away, showing the mounted state of the seal ring according to the fifth embodiment of the invention.
Figure 24A:
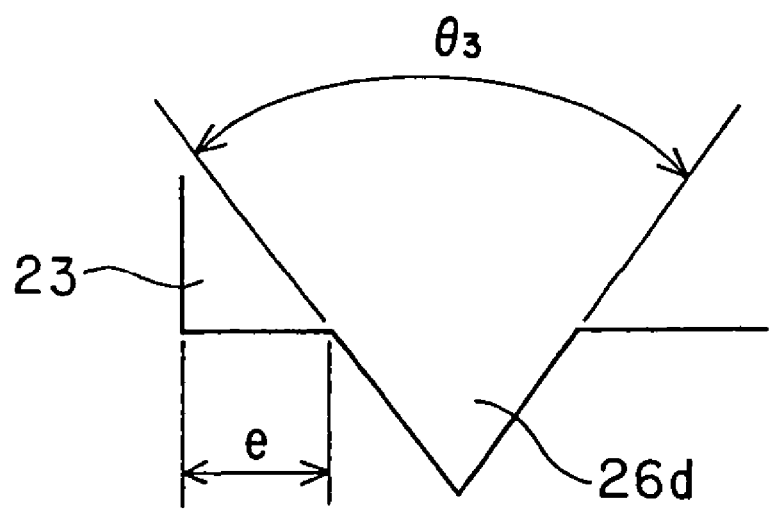
FIG. 24 is an enlarged view of the part W of the seal ring as indicated in FIG. 23.

FIG. 20 is a perspective view, partly broken away, showing the mounted state of the seal ring 1E according to the fifth embodiment of the invention, FIG. 21 is a perspective view, partly broken away, showing the spaced state of a separation portion in order to explain the construction of the separation portion of the seal ring 1E according to this embodiment, FIG. 22 is a sectional view of the separation portion (corresponding to the section 3-3 of the seal ring shown in FIG. 1), FIG. 23 is a top view, partly broken away, showing the mounted state of the seal ring according to this embodiment, and FIG. 24 is an enlarged view of the part W of the seal ring as indicated in FIG. 23. Incidentally, identical numerals and signs are assigned to the same constituents as in the foregoing embodiments, and they shall be omitted from description.

As in the seal ring 1 according to the first embodiment, the seal ring 1E according to this embodiment is formed with the stepped separation portion (special step cut), and it includes a convex part 21 and a concave part 22 in a widthwise (axial direction) pair, on one side of the outer peripheral side of the seal ring through a separated part, and a concave part 24 and a convex part 23 in a widthwise pair, also on the other side. Besides, it is constructed so that the convex part 21 and the concave part 24 may be fitted, while the concave part 22 and the convex part 23 may be fitted. Here, the convex part 21c constructs a circularly-arcuate convex part, and the concave part 24 constructs a circularly-arcuate concave part.

Here, the sectional shape of linear contact portions in the separation portion 2 of the seal ring 1E is shown in FIG. 22, and individual dimensions are the same as in the seal ring 1 (refer to FIG. 3).

In this embodiment, accordingly, the same advantages as in the first embodiment can be attained.

Besides, the feature of this embodiment is that, at the convex parts 21 and 23, separation surfaces 26 perpendicular to the axis of the seal ring, among fitting surfaces at which the convex parts and the concave parts are fitted, are respectively provided with protrusions which are protrusive toward opposing surfaces and which come into linear contact with the opposing surfaces.

As shown in FIGS. 20 and 21, at the convex part 21, the protrusion is a lip part 26b of substantially wedge-shaped section which has a thickness gradually decreasing toward the side of the convex part 23 in the axial direction, at a separation surface 26a opposing to the convex part 23 and being perpendicular to the axis. Besides, at the convex part 23, the protrusion is a lip part 26d of substantially wedge-shaped section which has a thickness gradually decreasing toward the side of the convex part 21 in the axial direction, at a separation surface 26c opposing to the convex part 21 and being perpendicular to the axis.

Herein, the lip parts 26b and 26d are provided so that substantially the entire regions thereof may come into linear contact with the respectively opposing separation surfaces 26c and 26a in substantially the diametric direction of the seal ring. In a case where an oil pressure P has acted from the sealed fluid side O, the lip parts 26b and 26d are respectively brought into pressed contact with the separation surfaces 26c and 26a so as to come into linear sealing contact.

Thus, even when the foreign matter has intruded into the separation portion 2, the separation surfaces 26a and 26c lie in linear contact, and hence, the foreign matter is not bitten between the separation surfaces 26a and 26c. Even if the foreign matter has been bitten, it is bitten between the parts lying in linear contact, and hence, it is easily vomited (a bite state is easily released).

Accordingly, even when the foreign matter existing in the sealed fluid has entered the separation portion 2, it is not bitten in the separation portion 2, and the surface Q hatched in FIG. 19B, for example, is not pushed onto the sealed fluid side O by the foreign matter, so that the state is not incurred where the linear contact portion 41b (the part T indicated in FIG. 19A) does not lie in contact with the sidewall surface 72.

It is accordingly permitted to prevent the drawback that the foreign matter stays between the linear contact portion 41b and the sidewall surface 72, thereby to wear this sidewall surface 72. Besides, since the foreign matter can be prevented from being bitten in the separation portion 2, the excessive wear can be prevented from appearing in each of the separation surfaces 26a and 26c (corresponding to the surface Q indicated in FIG. 19B).

Here in this embodiment, the protrusive height dimension d of each of the lip parts 26b and 26d is set at 0.15-0.2 mm. The dimension d is not restricted to this value as long as it is set in consideration of the size of the foreign matter existing in the sealed fluid.

Besides, the angle $\theta 3$ (refer to FIG. 24A) of the distal end of each of the lip parts 26b and 26d should favorably be set at 20-120 degrees, preferably 60-90 degrees, in consideration of moldability and durability.

Figure 24B:
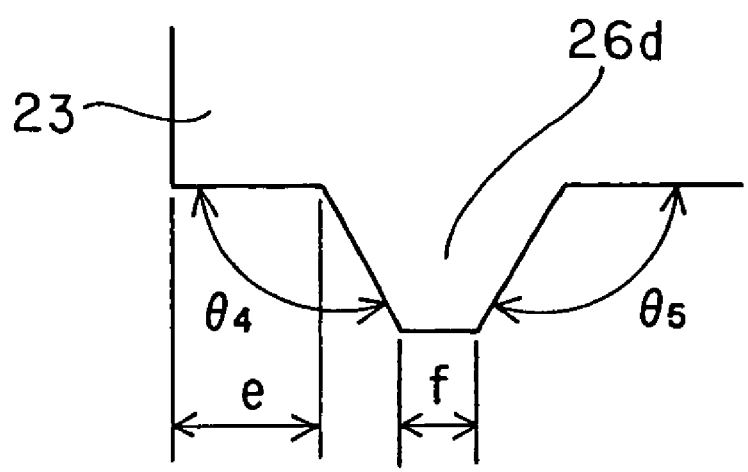

The shape of the distal end of each of the lip parts 26b and 26d may be an R shape, but in consideration of the workability of a mold, the shape may well be a substantially trapezoidal shape owing to the provision of a flat part as shown in FIG. 24B. Angles $\theta 4$ and $\theta 5$ in this case should favorably be set at 90-180 degrees, preferably 95-120 degrees, in consideration of the releasability of the mold. The dimension f of the flat part should favorably be set at 0.1-0.5 mm, preferably 0.15-0.3 mm, in consideration of the workability of the mold and the vomitability or eliminability of the foreign matter.

Besides, a dimension e from the distal end of the convex part 21 or 23 in the circumferential direction of the seal ring, to the corresponding lip part 26b or 26d in the circumferential direction, is not especially restricted. In case of considering sealability, however, the dimension e should favorably be as small as possible, and it should favorably be set at 0-1 mm, preferably 0-0.5 mm.

Figure 25:
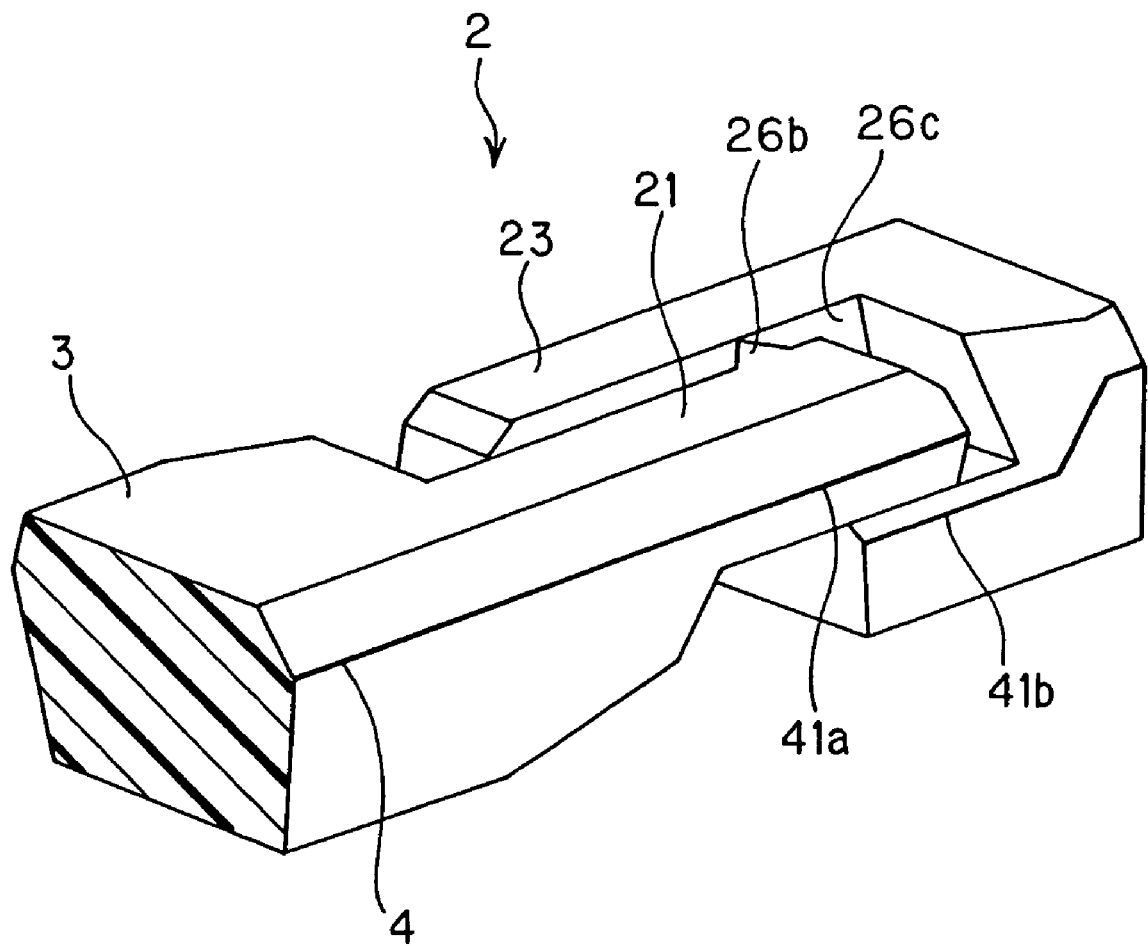
FIG. 25 is a perspective view, partly broken away, showing a case where a lip part is provided in one place, in the fifth embodiment of the invention.
Figure 26:
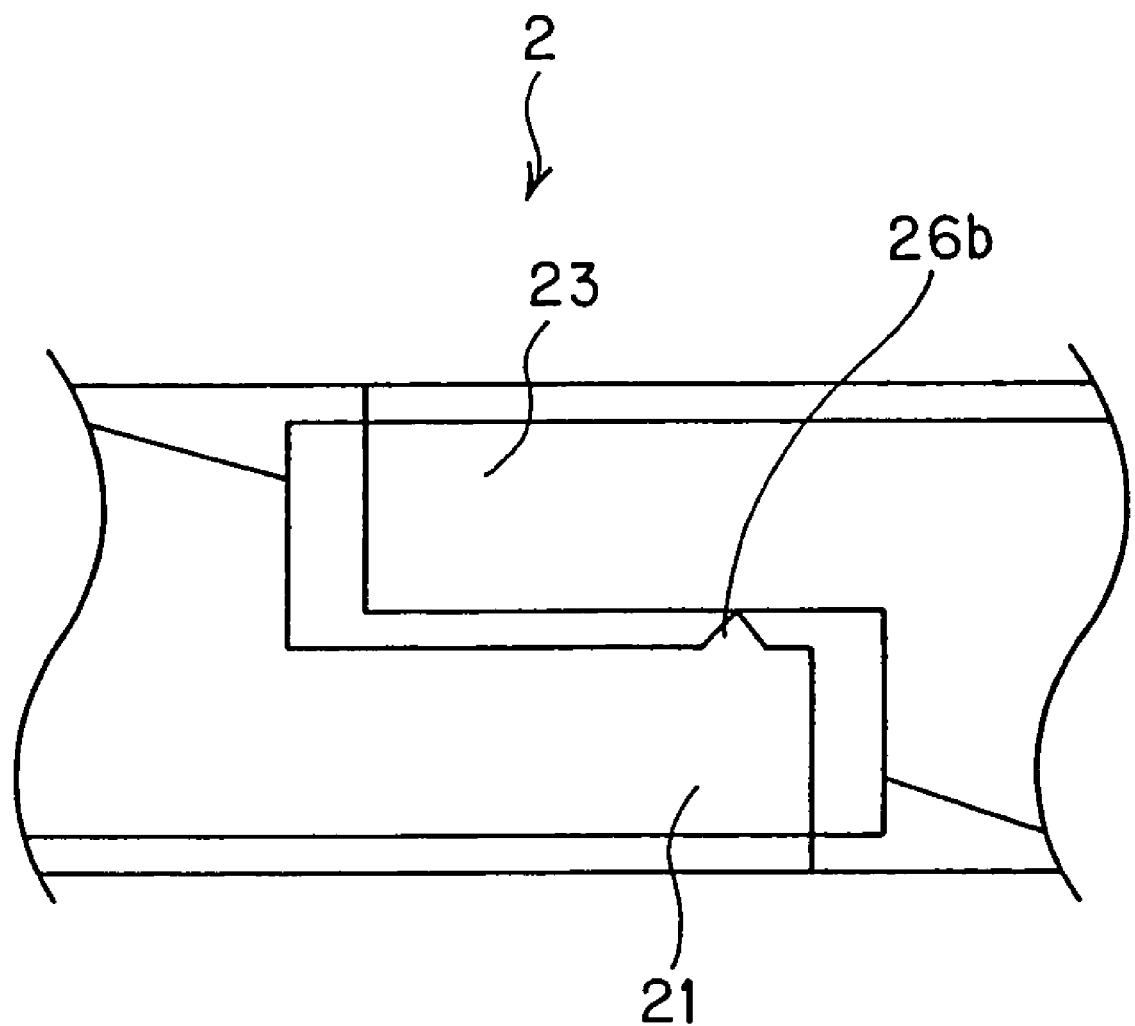
FIG. 26 is a top view, partly broken away, showing the case where the lip part is provided in one place, in the fifth embodiment of the invention.

In the seal ring shown in FIGS. 20 and 21, the convex part 21 and the concave part 23 are respectively provided with the protrusions, but this aspect is not restrictive, and either the convex part 21 or the concave part 23 may well be provided with the protrusion. FIGS. 25 and 26 show a case where the lip part 26b is provided at only the convex part 21.

When the lip part is provided in one place, the bitten foreign matter does not stay between the lip parts, and the vomitability or eliminability of the foreign matter is enhanced more. Besides, in case of considering assemblability, the lip part in one place is better.

Besides, in this embodiment, the separation surfaces 26 perpendicular to the axis are respectively provided with the protrusions which are protrusive toward the opposing surfaces, and which come into linear contact with the opposing surfaces. However, separation surfaces 25 concentric with the second seal portion 3 may well be provided with protrusions which come into linear contact.

Also in the seal ring 1E, a flat surface M which is flattened in the diametric direction may be provided on the inner peripheral side as in the seal ring 1A described with reference to FIGS. 6-8, whereby the enhancement of the mold releasability can be attained.

By the way, in the above, the seal ring which is formed with the stepped separation portion (special step cut) as in the seal ring 1 according to the first embodiment has been described, but this aspect is not restrictive, and this embodiment is well suited for application to the seal ring which is formed with the stepped separation portion (special step cut) as in the seal ring 1C according to the third embodiment.

Sixth Embodiment

Now, a seal ring 1F according to the sixth embodiment of the present invention will be described.

Figure 27:
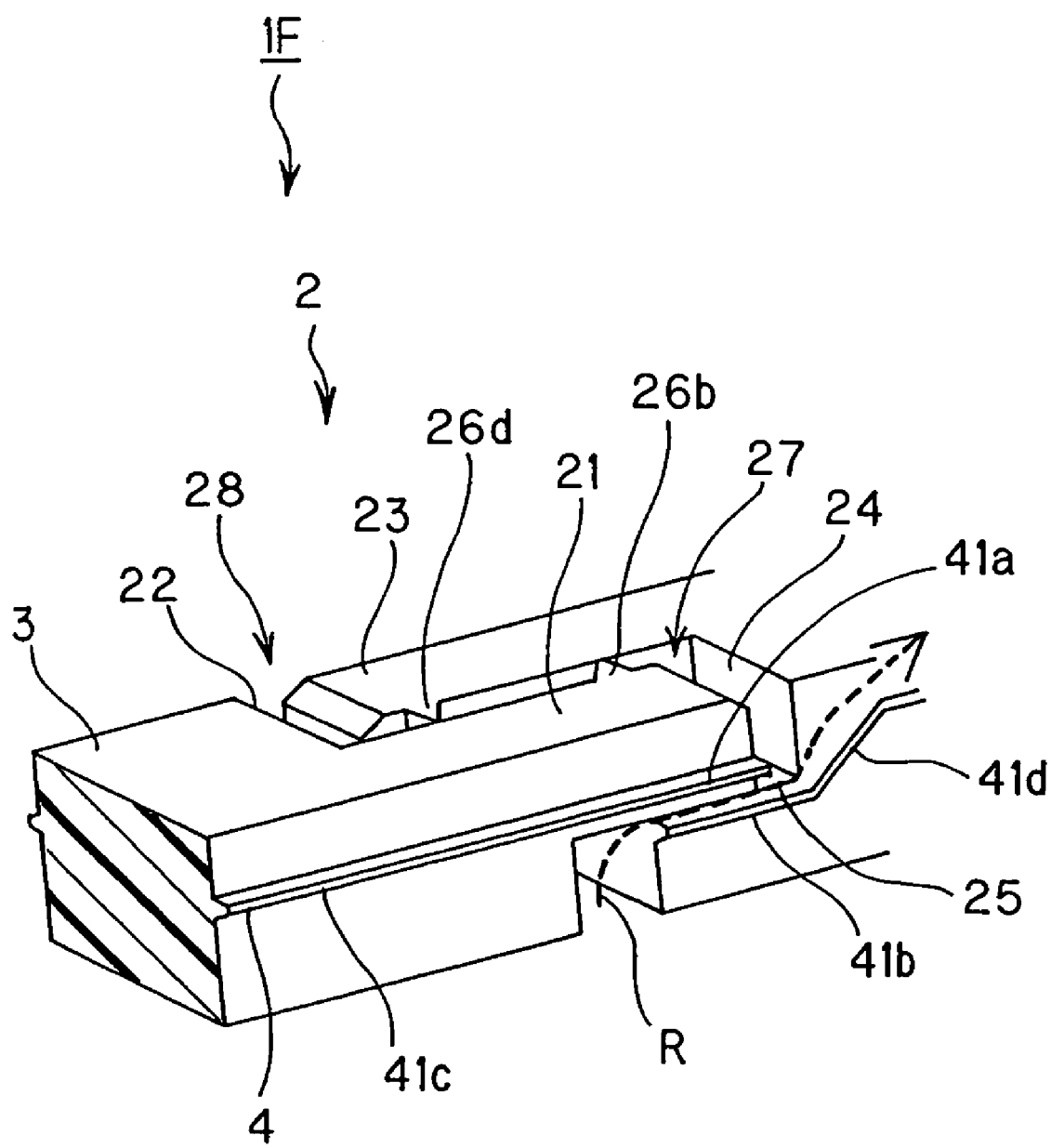
FIG. 27 is a perspective view, partly broken away, showing the mounted state of a seal ring according to the sixth embodiment of the invention.
Figure 28:
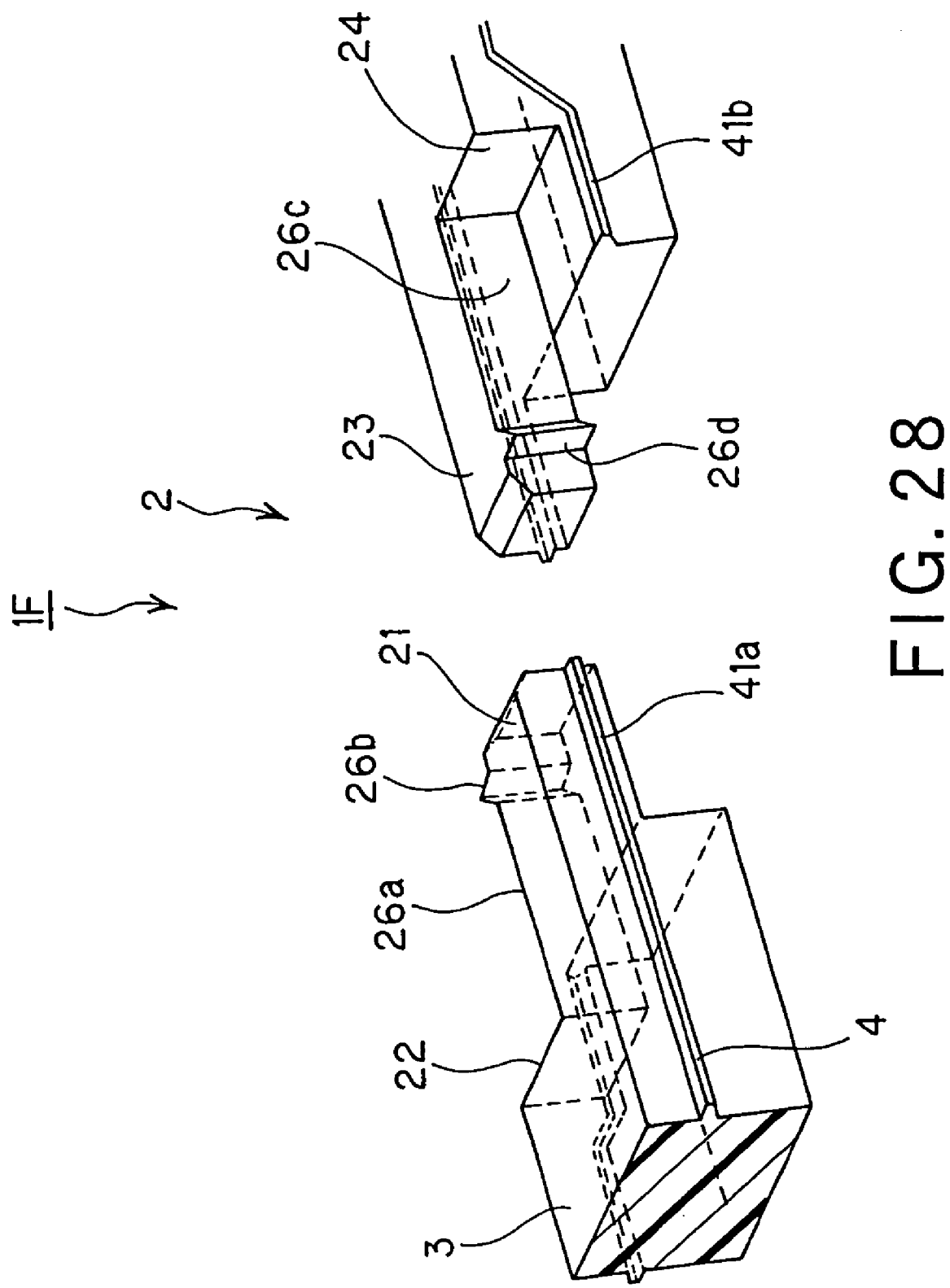
FIG. 28 is a perspective view, partly broken away, showing the spaced state of a separation portion in order to explain the construction of the separation portion of the seal ring according to the sixth embodiment of the invention.
Figure 29:
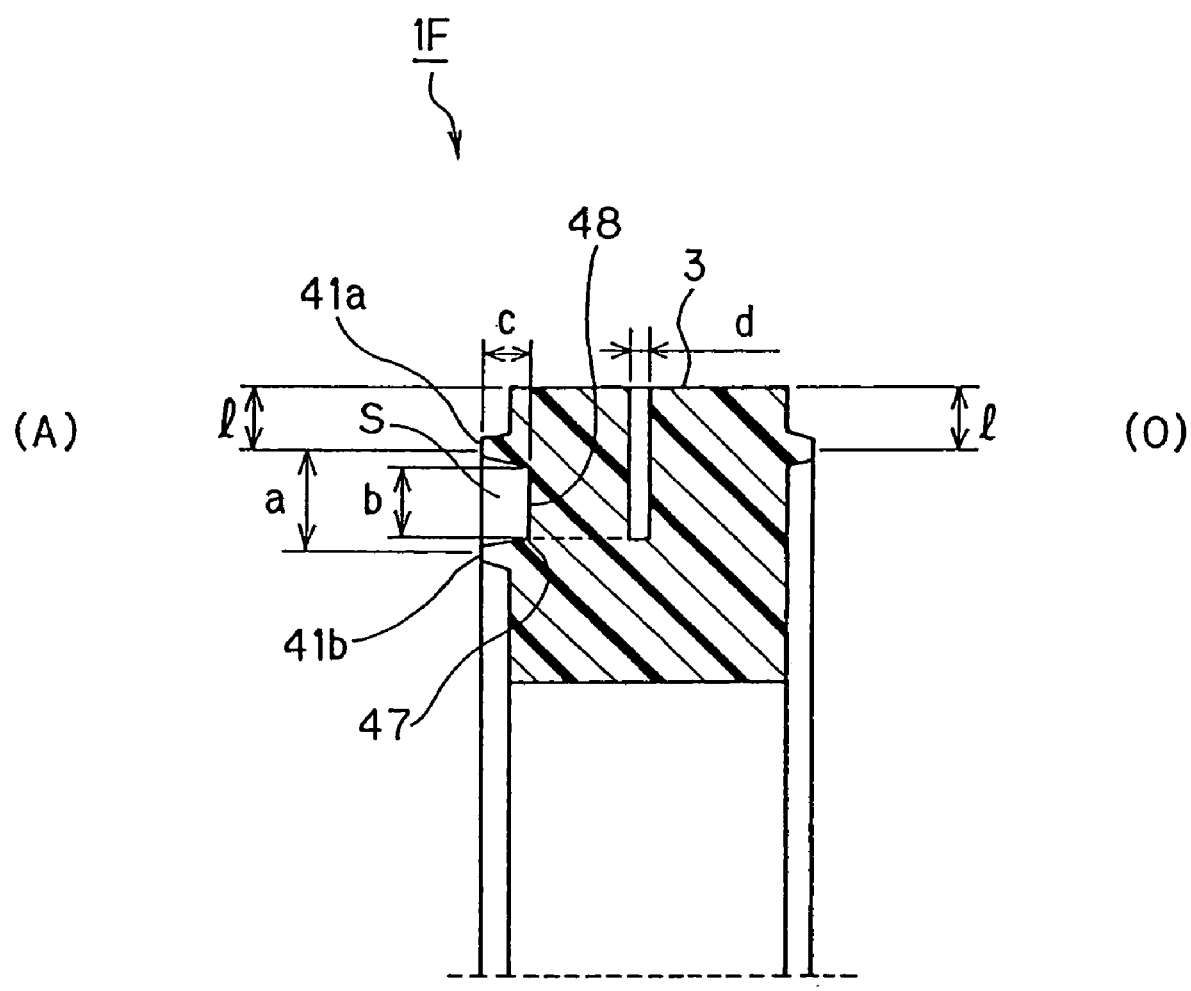
FIG. 29 is a sectional view of the separation portion (corresponding to the section 3-3 of the seal ring shown in FIG. 1)

FIG. 27 is a perspective view, partly broken away, showing the mounted state of the seal ring 1F according to the sixth embodiment of the invention, FIG. 28 is a perspective view, partly broken away, showing the spaced state of a separation portion in order to explain the construction of the separation portion of the seal ring 1F according to this embodiment, and FIG. 29 is a sectional view of the separation portion (corresponding to the section 3-3 of the seal ring shown in FIG. 1). Incidentally, identical numerals and signs are assigned to the same constituents as in the foregoing embodiments, and they shall be omitted from description.

As compared with the seal ring 1E according to the fifth embodiment, this embodiment consists in that the sectional shape of the seal ring is made substantially rectangular as in the seal ring 1B described in the second embodiment, and that the side surface of the seal ring of substantially rectangular section on the unsealed fluid side A is provided with linear contact portions which come into linear contact with the sidewall surface 72 of an annular groove 71.

That is, the seal ring 1F according to this embodiment has the substantially rectangular sectional shape, and as in the seal ring 1E according to the fifth embodiment, it is formed with the stepped separation portion (special step cut), and it includes a convex part 21 and a concave part 22 in a widthwise (axial direction) pair, on one side of the outer peripheral side of the seal ring through a separated part, and a concave part 24 and a convex part 23 in a widthwise pair, also on the other side. Besides, it is constructed so that the convex part 21 and the concave part 24 may be fitted, while the concave part 22 and the convex part 23 may be fitted.

Here, the sectional shape of linear contact portions in the separation portion 2 of the seal ring 1F is shown in FIG. 29, and individual dimensions are the same as in the seal ring 1B (refer to FIG. 11).

By the way, the seal ring which is formed with the stepped separation portion (special step cut) as in the seal ring 1B according to the second embodiment has been described in this embodiment, but this aspect is not restrictive, and this embodiment is well suited for application to the seal ring which is formed with the stepped separation portion (special step cut) as in the seal ring 1D according to the fourth embodiment.

EXAMPLE 3

A more practicable example will be described on the seal ring according to the sixth embodiment.

First, as a Comparative Example, there was used the seal ring 1B of substantially rectangular section shown in FIGS. 9-12 in the second embodiment and fabricated by injection molding with polyether etherketone (PEEK) in which several sorts of fillers were compounded.

Besides, in this example, the seal ring molded as the Comparative Example was additionally worked to obtain the seal ring 1F shown in FIGS. 27-29 in the sixth embodiment.

Here, the dimensions of the individual parts of the seal ring 1F were set at seal-ring outside diameter=47.85 mm, seal-ring wall thickness=1.9 mm, seal-ring height=2 mm, l=0.6 mm, β=about 116 degrees, b=0.2 mm, c=0.2 mm, ls=0.2 mm, d=0.2 mm, θ4=θ5=120 degrees, e=0.4 mm, and f=0.2 mm.

Incidentally, the dimensions of the individual parts of the seal rings were equal in both this example and the Comparative Example.

Using the two kinds of seal rings, endurance tests (wear acceleration tests) were conducted by an endurance test equipment.

In this example, the endurance test equipment 90 shown in FIG. 18 as explained in Example 2 was employed.

Conditions were the same as in Examples 1 and 2. As a foreign matter, Testing dust type-7 (Kanto loam) stipulated in "JIS Z 8901", in amounts of 10 mg, was thrown into pipes located just in front of the mounted portions of the seal rings, at intervals of 24 hours.

Further, in this example, the testing dust type-7 stipulated in "JIS Z 8901", in amounts of 1 mg, was applied as coatings between the fitting surfaces, namely, separation surfaces 26a and 26c of the separation portions of the seal rings.

Two samples were used in one time of test, and an oil pressure was fed between the samples. Besides, 10 samples were tested for each of this example and the Comparative Example (that is, the number of times of tests was five).

In this example, wear depths became 10 μm or less in all of the 10 samples, and the conspicuous wear of the side surface of an aluminum shaft was not observed. On the other hand, in the Comparative Example, wear depths were held at or below 10 μm in 8 of the 10 samples, but conspicuous wear appeared in the remaining 2 of the 10 samples.

Indicated in Table 3 are the test results of those 2 of the 10 samples of this example in which the wear depths of the side surface of the aluminum shaft were large, and the test results of those 2 samples of the Comparative Example which exhibited the conspicuous wear.

TABLE 3

|  | Mounted position of Seal Ring | Maximum wear depth of Side surface of Aluminum shaft (μm) | Quantity of leakage at Start of Test (cc/min) | Quantity of leakage at End of Test (cc/min) |
| --- | --- | --- | --- | --- |
| Example | Ring slot 202a | 6 | 170 | 150 |
|  | Ring slot 202b | 5 | 160 | 150 |
| Comparative Example | Ring slot 202a | 54 | 160 | 240 |
|  | Ring slot 202b | 46 | 150 | 250 |

As indicated in Table 3, in this example, it is permitted to make the frequency of wear appearance remarkably lower than in the Comparative Example, and to attain the enhancement of the reproducibility of a wear-proof performance.

Seventh Embodiment

A seal ring 1G according to the seventh embodiment of the present invention will be described with reference to FIG. 30-FIG. 33.

Figure 30:
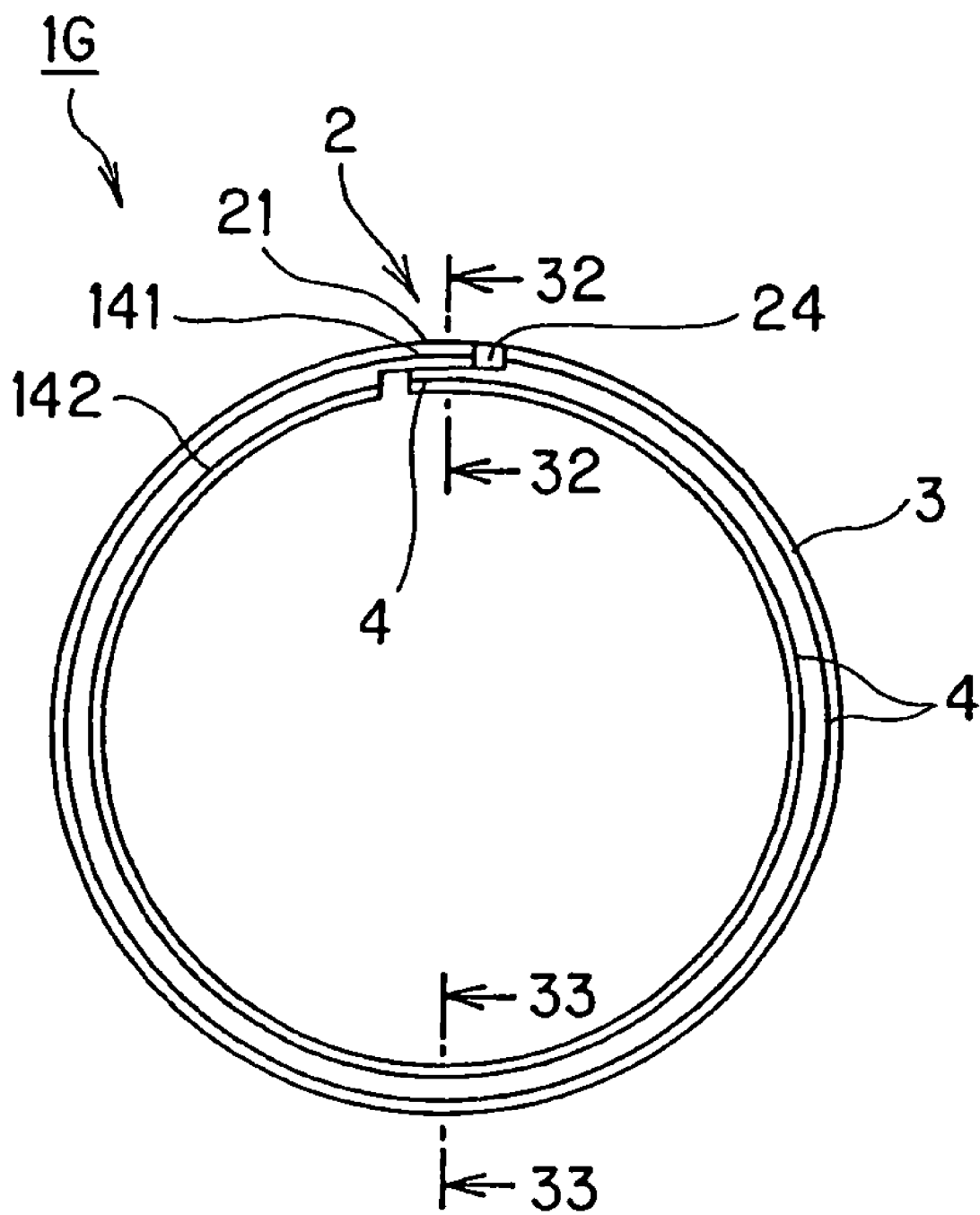
FIG. 30 is a plan view of a seal ring according to the seventh embodiment of the invention.
Figure 31:
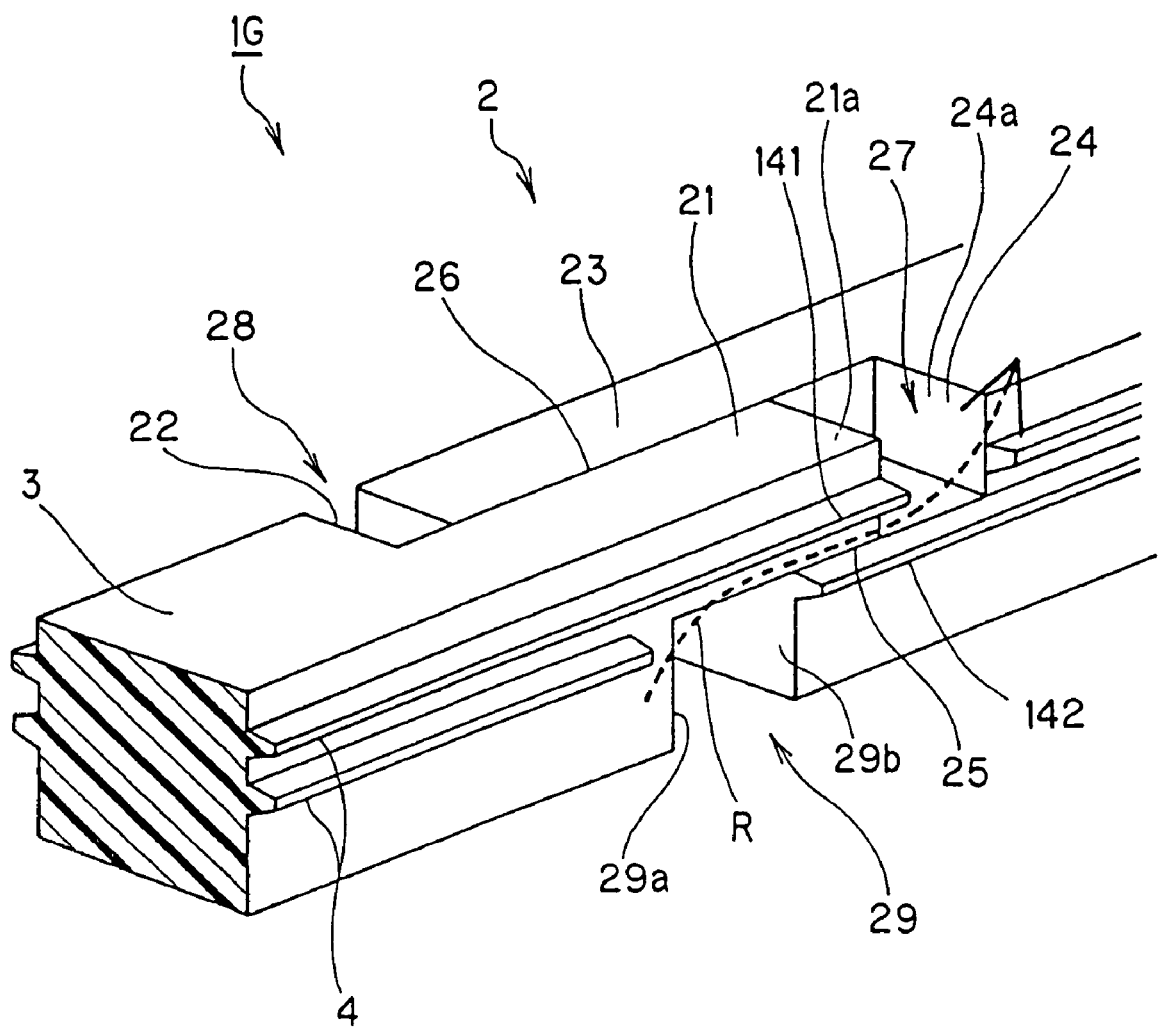
FIG. 31 is a perspective view, partly broken away, showing the mounted state of the seal ring according to the seventh embodiment of the invention.
Figure 32:
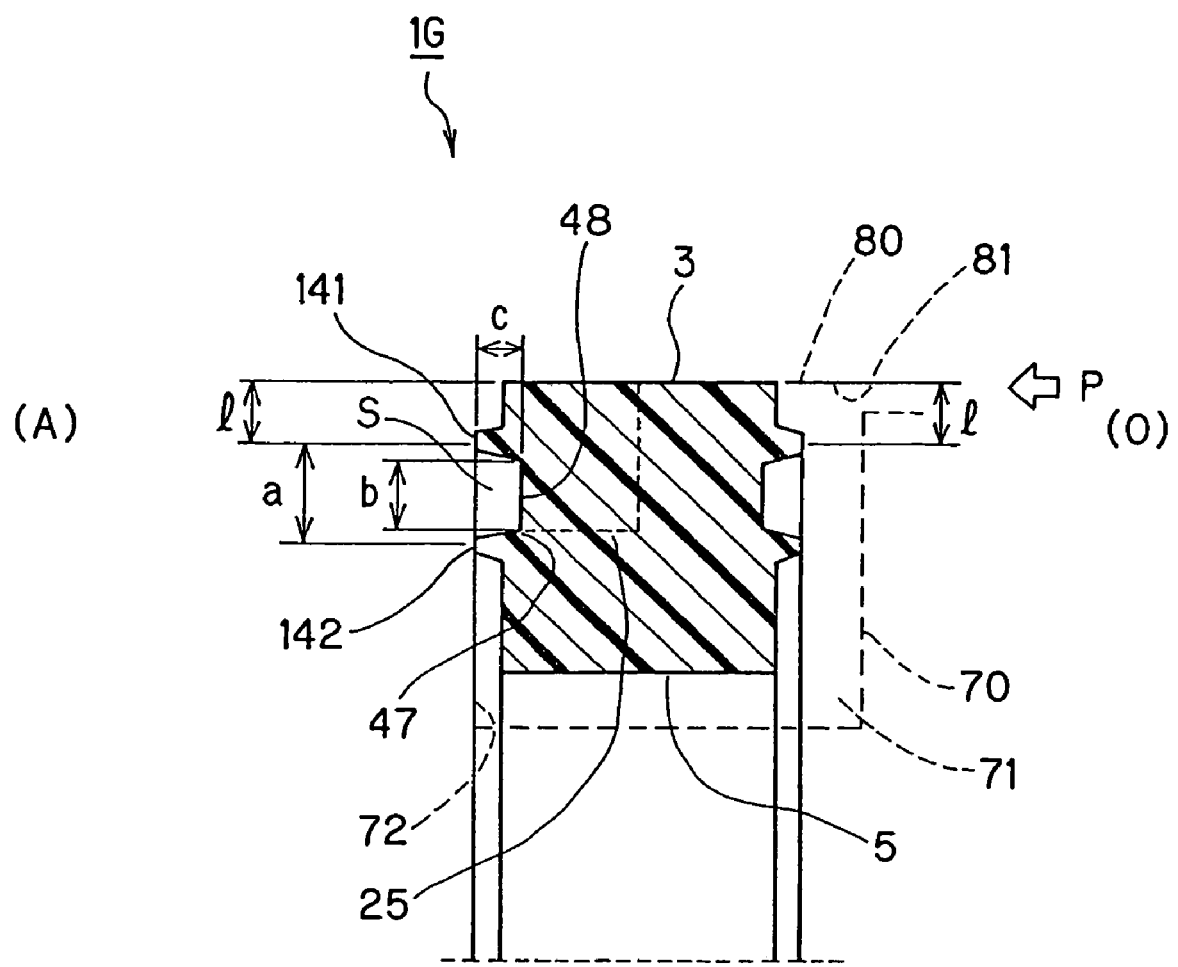
FIG. 32 is a sectional view taken along the section 32-32 of the seal ring as indicated in FIG. 30.
Figure 33:
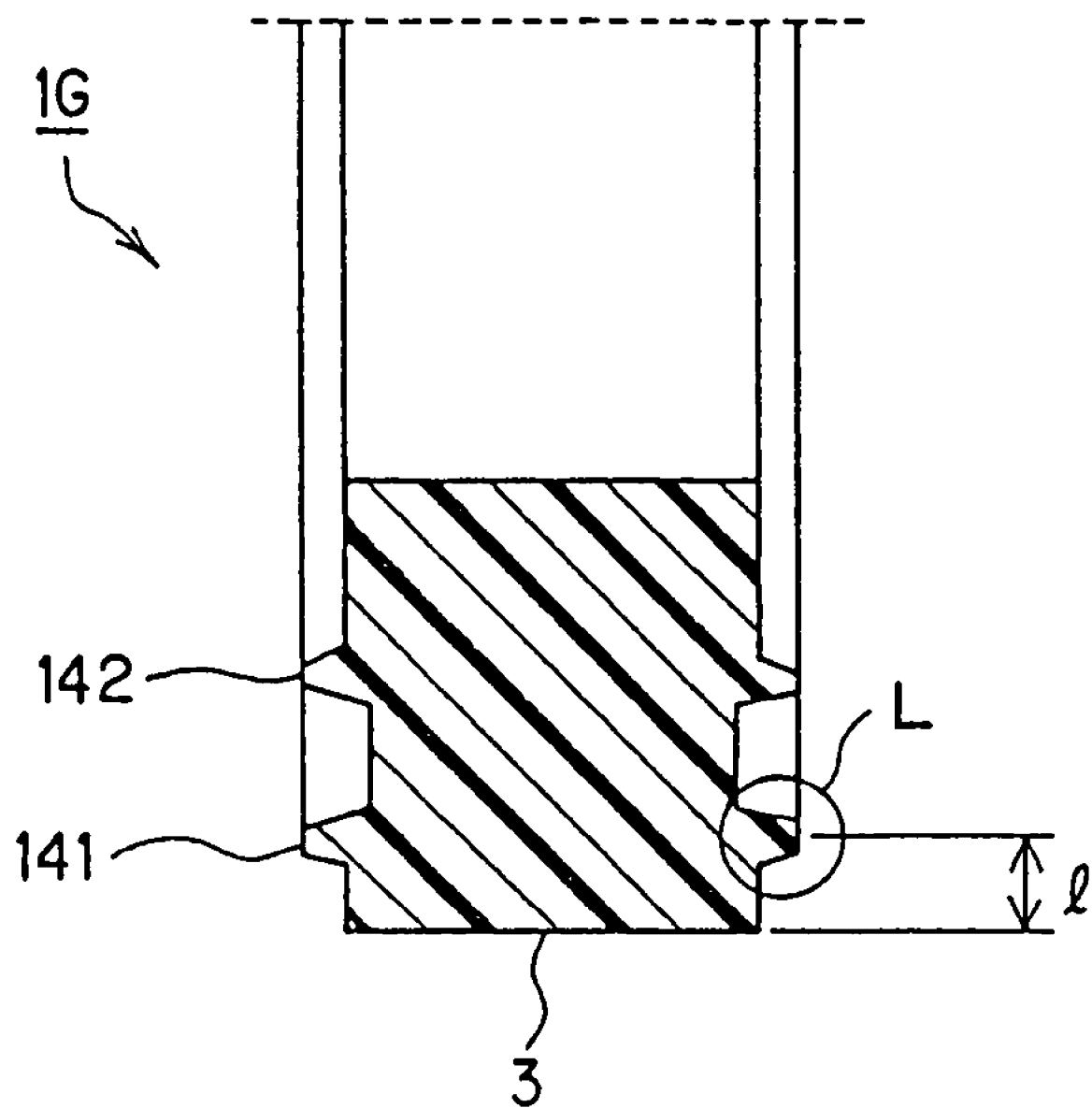
FIG. 33 is a sectional view taken along the section 33-33 of the seal ring as indicated in FIG. 30.

FIG. 30 is a plan view of the seal ring 1G according to the seventh embodiment of the invention, FIG. 31 is a perspective view, partly broken away, showing the mounted state of the seal ring 1G according to this embodiment, FIG. 32 is a sectional view of the seal ring 1G taken along 32-32 as indicated in FIG. 30, and FIG. 33 is a sectional view of the seal ring taken along 33-33 as indicated in FIG. 30. Incidentally, identical numerals and signs are assigned to the same constituents as in the foregoing embodiments, and they shall be omitted from description.

In each of the foregoing embodiments, the first seal portion 4 is constructed of the linear contact portions 41 of single line as come into linear contact with the sidewall surface 72 of the annular groove 71, but in this embodiment, it is constructed of linear contact portions of two lines.

More specifically, in the seal ring 1G according to this embodiment, the first seal portion 4 is constructed of the linear contact portions of two lines (first linear contact portion 141 and second linear contact portion 142) as protrude from the side surface of the seal ring of substantially rectangular section on the unsealed fluid side A, toward the sidewall surface 72 of an annular groove 71, and as come into linear contact with the sidewall surface 72.

The first linear contact portion 141 is provided continuously over the whole circumference of the seal ring from a convex part 21 lying on one side of a separation portion 2 (from a distal end surface 21a or the vicinity of the distal end surface 21a), to a concave part 24 lying on the other side (to an opposing surface 24a or the vicinity of the opposing surface 24a).

Besides, the second linear contact portion 142 is provided continuously over the whole circumference from an end part 29a which is provided on the inside diameter side of the convex part 21 and which defines a gap 29 on the inner peripheral side of the separation portion 2, or the vicinity of the end part (from one side of the separation portion 2), to an end part 29b which is provided on the inside diameter side of the concave part 24 and which defines the gap 29, or the vicinity of the end part (to the other side of the separation portion 2).

Besides, as shown in FIG. 32, the first linear contact portion 141 is constructed of an mountain shaped portion (protrusion) protruding toward the sidewall surface 72 of the annular groove 71, at the position of a length l on the inside diameter side as viewed from the surface of a second seal portion 3 on the unsealed fluid side A.

Besides, the second linear portion 142 is constructed of an mountain shaped portion (protrusion) protruding toward the sidewall surface 72 of the annular groove 71 similarly to the first linear contact portion 141, at the position of a length a on the inside diameter side as viewed from the first linear contact portion 141. Also, in this embodiment, the second linear contact portion 142 is provided at the concave part 24 so as to protrude from that side surface of the seal ring which is the separation surface 25 of the concave part 24 on the unsealed fluid side A.

Here, the first linear contact portion 141 and the second linear contact portion 142 are constructed without providing the shift part 41d explained in the foregoing embodiment (the part at which the linear contact portion lying on the outer peripheral side shifts to the linear contact portion lying on the inner peripheral side).

The first linear contact portion 141 and the second linear contact portion 142 are constructed in this manner, whereby the length of the parts of these linear contact portions traversing in the diametric direction (the length of the parts lying in contact in the diametric direction, within parts lying in contact with the sidewall surface 72 of the annular groove 71) can be decreased. It is therefore possible to lower the probability of the bite of any foreign matter into the linear contact portions and the probability of the intrusion of the foreign matter to that extent. Accordingly, the further stabilization of a contact state can be realized. Besides, it is more effective to dispose the first linear contact portion 141 and the second linear contact portion 142 substantially concentrically with a shaft 70.

The first linear contact portion 141 and the second linear contact portion 142 are disposed in this manner, whereby these linear contact portions 141 and 142 are spaced in the diametric direction in the separation portion 2, and a leakage path R (refer to FIG. 31) is formed therebetween.

Here, the sectional shape of the linear contact portions in the separation portion 2 of the seal ring 1G will be explained with reference to FIG. 32. In a section shown in FIG. 32, the dimensional relations of the first linear contact portion 141 and the second linear contact portion 142 to the body of the seal ring 1G are the same as those of the linear contact portions 41a and 41b to the body of the seal ring 1B shown in FIG. 10.

In this embodiment, a sectional part S which is determined by dimensions a, b and c is the diametric section of a space which is formed by the first linear contact portion 141 and second linear contact portion 142, the end surface 48 of the convex part 21 on the unsealed fluid side A, and the sidewall surface 72 of the annular groove 71. That is, the sectional part corresponds to the section of the leakage path R which is formed owing to the fact that the first linear contact portion 141 and the second linear contact portion 142 are provided at a diametric distance in the separation portion 2. It is accordingly permitted to control the quantity of leakage, by appropriately adjusting the area of the sectional part S.

Besides, in this embodiment, a dimension (l+a) should desirably be small for reducing a dragging torque which is caused by the relative rotation of the shaft and the seal ring. However, when the dimension l is excessively small, the seal ring might lie in the annular interspace between the shaft hole of a housing 80 and the shaft 70 without contacting the sidewall surface 72 of the annular groove 71 at its first linear contact portion 141. That is, it is apprehended that a gap will appear in the linear contact part between the side surface of the seal ring and the sidewall surface 72 of the annular groove 71, so the quantity of leakage will increase. Besides, making the dimension a small leads to making the dimension b small, so that when the dimension a is excessively small, the foreign matter is apprehended to be incapable of passing. Also the dimension l may be set at the same dimension as in the foregoing embodiments.

A part L shown in FIG. 33 corresponds to the first linear contact portion 141, and the sectional shape of this part becomes the same as the sectional shape shown in FIG. 12. Besides, the sectional shape of the second linear contact portion 142 is the same shape.

As described above, according to this embodiment, the same advantages as in the second embodiment can be attained.

By the way, also in this embodiment, in the separation portion 2, the first linear contact portion 141 and the second linear contact portion 142 may well be respectively extended to the end parts in the circumferential direction, and they need not be extended so. Besides, the first linear contact portion 141 and the second linear contact portion 142 are provided so as to be placed one over the other when projected in the diametric direction, but the invention is not restricted to this aspect.

Even in a case where, in the separation portion 2, the first linear contact portion 141 and the second linear contact portion 142 are not placed one over the other slightly when projected in the diametric direction, the leakage path is formed owing to the fact that these linear contact portions are respectively provided on the inside diameter side and outside diameter side of the seal ring. Therefore, the sectional part S is supposed to be formed, and it is adjusted, whereby the quantity of leakage is controllable.

Besides, in a case where a degree to which the linear contact portions are not placed one over the other when projected in the diametric direction has become higher than in the above, the quantity of leakage is determined by a part which minimizes a sectional area that is formed by either of the end parts of the first linear contact portion 141 and the second linear contact portion 142 on one side of the separation portion 2, either of the end parts of the first linear contact portion 141 and the second linear contact portion 142 on the other side of the separation portion 2, the side surface of the ring body (the end surface 48 of the convex part 21 on the unsealed fluid side A), and the sidewall surface 72 of the annular groove 71.

Besides, although the fourth and sixth embodiments have been described as the modifications of the seal ring 1 according to the second embodiment (the fourth and sixth embodiments have been described as the modifications of the seal ring according to the first embodiment), the shape as explained in the fourth and sixth embodiments is similarly favorable also in the seal ring 1G according to this embodiment. This can be differently stated as that, in each of the respective seal rings 1D and 1F according to the fourth and sixth embodiments, the first seal portion 4 is constructed of the first linear contact portion 141 and second linear contact portion 142 mentioned above, instead of the linear contact portions 41.

More specifically, in the seal ring 1G, the protrusive part as which the outer-peripheral side part of the separation portion 2 is protruded in the circumferential direction relative to the inner-peripheral side part thereof, and the recessed part as which the outer-peripheral side part of the separation portion is recessed in the circumferential direction relative to the inner-peripheral side part thereof and into which the protrusive part is fitted, are provided as in the seal ring 1C or 1D, whereby the separation portion of the seal ring 1G is endowed with a directivity.

Besides, in the seal ring 1G, the convex parts 21 and 23 are respectively provided with the protrusions which are protrusive toward the opposing surfaces and which come into linear contact with the opposing surfaces, on the separation surfaces 26 perpendicular to the axis, among the fitting surfaces where the convex part and the concave part are fitted, as in the seal ring 1E or 1F, thereby to obtain the construction which is difficult of biting the foreign matter and easy of vomiting the foreign matter even in the case where this foreign matter has intruded into the separation portion 2.

EXAMPLE 4

Now, a more practicable example will be described.
There were employed the same seal rings as the Comparative Examples 1 and 2 explained in Example 1.
Besides, as this example, the seal ring 1G shown in FIGS. 30-33 in the preceding embodiment was obtained by injection molding with polyether etherketone (PEEK) in which several sorts of fillers were compounded.

Here, the dimensions of the individual parts of the seal ring 1G, namely, the seal-ring outside diameter, the seal-ring wall thickness, the seal-ring height, etc. were set as in the seal ring 1F (1B) employed in Example 3.

Endurance tests were conducted using the three kinds of seal rings, and under the same conditions as in Example 1. The results of the tests are indicated in Table 4.

TABLE 4

| | Maximum wear depth of Side surface of Aluminum shaft (μm) | Quantity of leakage at Start of Test (cc/min) | Quantity of leakage at End of Test (cc/min) | Remarks |
|---|---|---|---|---|
| Example | 2-4 | 130-140 | 130-140 | |
| Comparative Example 1 | 500-1400 | 10-20 | Above 1000 | Interrupted in 30 hours due to large leakage quantity |
| Comparative Example 2 | 2-4 | 300-400 | 300-400 | |

As indicated in Table 4, it has been verified that this example is much less than the Comparative Example 1 in the wear depth of the aluminum shaft, and that, when compared with the Comparative Example 2, this example realizes a nearly equal wear depth of the aluminum shaft with a leakage quantity of half or less.

INDUSTRIAL APPLICABILITY

As described above, the present invention provides a seal ring of excellent quality which can attain reduction in the quantity of leakage while reducing rotational sliding friction, and which maintains a stable sealing performance over a long term.

The invention claimed is:
1. A seal ring comprising:
a first seal portion which seals a sidewall surface of an annular groove on an unsealed fluid side of a shaft, the annular groove being provided in one of two members that are concentrically assembled so as to be relatively rotatable;
a second seal portion which seals a surface of the other of the two members,
an annular interspace between the two members being sealed by the first and second seal portions,
a ring body with a separation portion separated in one place in a circumferential direction to include a first end part and a second end part,
said first seal portion being provided with linear contact portions which come into linear contact with the sidewall surface of the annular groove on the unsealed fluid side, so as to extend continuously over a whole circumference of the seal ring from one side of said separation portion to the other side thereof, and said linear contact portion which is provided on one side of said separation portion, and said linear contact portion which is provided on the other side of said separation portion being located at a distance in a radial direction of the seal ring so that an inner circumferential surface of the first end part on one side of the separation portion comes into contact with an outer circumferential surface of the second end part on the other side of the separation portion and said linear contact portions having a narrower width in the radial direction than adjacent parts of the ring body to control a quantity of leakage from a sealed fluid side to the unsealed fluid side of the shaft; and wherein said linear contact portions include:

a first linear contact portion which is extended continuously from one side of said separation portion to the other side thereof, and which comes into linear contact with the sidewall surface of the annular groove on the unsealed fluid side; and a second linear contact portion which lies nearer a groove bottom side of the annular groove than said first linear contact portion, which is extended continuously from one side of said separation portion to the other side thereof, and which comes into linear contact with the sidewall surface of the annular groove on the unsealed fluid side, said linear contact portion provided on one side of said separation portion is said first linear contact portion, while said linear contact portion provided on the other side of said separation portion is said second linear contact portion.

2. The seal ring as defined in claim 1, wherein a quantity of leakage is adjusted by a size of a sectional area of a section of a space in the radial direction, the space being formed by said linear contact portion provided on one side of said separation portion, said linear contact portion provided on the other side of said separation portion, a part of the ring body lying between said linear contact portion provided on one side and said linear contact portion provided on the other side, and the sidewall surface of the annular groove is on the unsealed fluid side.

3. The seal ring as defined in claim 1, wherein said linear contact portions define protruding portions which protrude from a side surface of the ring body, toward the sidewall surface of the annular groove on the unsealed fluid side.

4. The seal ring as defined in claim 1, wherein said linear contact portion provided on one side of said separation portion is located nearer a side of said other member than said linear contact portion provided on the other side of said separation portion.

5. The seal ring as defined in claim 4, wherein on the other member side of the ring body, the separation end part of said one side which is provided with said linear contact portion is provided with a first circularly-arcuate protrusive part which protrudes in the circumferential direction, while the separation end part of said other side is provided with a first circularly-arcuate recessed part which is fitted with said first circularly-arcuate protrusive part, and said first circularly-arcuate protrusive part is provided with a second circularly-arcuate part which protrudes in the circumferential direction, while said first circularly-arcuate recessed part is provided with a second circularly-arcuate recessed part which is fitted with said second circularly-arcuate protrusive part.

6. The seal ring defined in claim 5, wherein one of respective fitting surfaces at which said second circularly-arcuate protrusive part and second circularly-arcuate recessed part are fitted is provided with a protrusion which comes into linear contact with the other fitting surface.

7. The seal ring as defined in claim 1, wherein the separation end part of said one side of said separation portion is provided with a circularly-arcuate protrusive part which protrudes in the circumferential direction, while the separation end part of said other side of said separation portion is provided with a circularly-arcuate recessed part which is fitted with said circularly-arcuate protrusive part, and one of respective fitting surfaces at which said circularly-arcuate protrusive part and said circularly-arcuate recessed part are fitted is provided with a protrusion which comes into linear contact with the other fitting surface.

8. The seal ring as defined in claim 7, wherein the fitting surfaces are surfaces which are radially spaced from an axis of said seal ring, and which extend in the circumferential direction.

9. A seal ring comprising:

a first seal portion which seals a sidewall surface of an annular groove on an unsealed fluid side of a shaft, the annular groove being provided in one of two members that are concentrically assembled so as to be relatively rotatable; and a second seal portion which seals a surface of the other of the two members, an annular interspace between the two members being sealed by the first and second seal portions, a ring body with a separation portion separated in one place in a circumferential direction to include a first end part and a second end part, said first seal portion being provided with linear contact portions which come into linear contact with the sidewall surface of the annular groove on the unsealed fluid side, so as to extend continuously over a whole circumference of the seal ring from one side of said separation portion to the other side thereof, said first and second end parts of the ring body having abutting parts which abut each other in a radial direction of the seal ring, said linear contact portions having adjacent parts one of which is provided on said abutting part of said first end of the ring body and the other of which is provided on said abutting part of said second end part of the ring body, said adjacent parts being located at a distance in the radial direction of the seal ring so that a gap is formed therebetween, and a quantity of leakage from a sealed fluid side to the unsealed fluid side of the shaft being controlled by a space defined by said abutting parts, said adjacent parts, and the sidewall surface of the annular groove.

10. The seal ring as defined in claim 9, wherein a first portion of said linear contact portion is provided on one side of said separation portion, and a second portion of said linear contact portion is provided on the other side of said separation portion and said first and second portions have regions which are placed one over the other when said linear contact portions are projected in the radial direction.

11. The seal ring as defined in claim 9, wherein a quantity of leakage is adjusted by a size of a sectional area of a section of a space in the radial direction, the space being formed by said linear contact portion provided on one side of said separation portion, said linear contact portion provided on the other side of said separation portion, a part of the ring body lying between said linear contact portion provided on one side and said linear contact portion provided on the other side, and the sidewall surface of the annular groove is on the unsealed fluid side.

12. The seal ring as defined in claim 9, wherein said linear contact portions define protruding portions which protrude from a side surface of the ring body, toward the sidewall surface of the annular groove on the unsealed fluid side.

13. The seal ring as defined in claim 9, wherein said linear contact portion provided on one side of said separation portion is located nearer a side of said other member than said linear contact portion provided on the other side of said separation portion.

14. The seal ring as defined in claim 13, wherein on the other member side of the ring body, the separation end part of said one side which is provided with said linear contact portion is provided with a first circularly-arcuate protrusive part which protrudes in the circumferential direction, while the separation end part of said other side is provided with a first circularly-arcuate recessed part which is fitted with said first circularly-arcuate protrusive part, and said first circularly-arcuate protrusive part is provided with a second circularly-arcuate part which protrudes in the circumferential direction, while said first circularly-arcuate recessed part is provided with a second circularly-arcuate recessed part which is fitted with said second circularly-arcuate protrusive part.

15. The seal ring defined in claim 14, wherein one of respective fitting surfaces at which said second circularly-arcuate protrusive part and second circularly-arcuate recessed part are fitted is provided with a protrusion which comes into linear contact with the other fitting surface.

16. The seal ring as defined in claim 9, wherein the separation end part of said one side of said separation portion is provided with a circularly-arcuate protrusive part which protrudes in the circumferential direction, while the separation end part of said other side of said separation portion is provided with a circularly-arcuate recessed part which is fitted with said circularly-arcuate protrusive part, and one of respective fitting surfaces at which said circularly-arcuate protrusive part and said circularly-arcuate recessed part are fitted is provided with a protrusion which comes into linear contact with the other fitting surface.

17. The seal ring as defined in claim 16, wherein the fitting surfaces are surfaces which are radially spaced from an axis of said seal ring, and which extend in the circumferential direction.

18. The seal ring as defined in claim 9, wherein said linear contact portions include:

a first linear contact portion which is extended continuously from one side of said separation portion to the other side thereof, and which comes into linear contact with the sidewall surface of the annular groove on the unsealed fluid side; and a second linear contact portion which lies nearer a groove bottom side of the annular groove than said first linear contact portion, which is extended continuously from one side of said separation portion to the other side thereof, and which comes into linear contact with the sidewall surface of the annular groove on the unsealed fluid side, said linear contact portion provided on one side of said separation portion is said first linear contact portion, while said linear contact portion provided on the other side of said separation portion is said second linear contact portion.

* * * * *